United States Patent [19]
Matsuura et al.

[11] Patent Number: 5,818,541
[45] Date of Patent: Oct. 6, 1998

[54] TELEVISION RECEIVER AND TUNING CONTROL METHOD INCLUDING A PROGRAM-SCANNING MODE

[75] Inventors: Chifumi Matsuura, Tokyo; Haruko Kono; Kazuya Shimomura, both of Kanagawa, all of Japan

[73] Assignee: Sony Corporation, Tokyo, Japan

[21] Appl. No.: 711,955

[22] Filed: Sep. 6, 1996

[30] Foreign Application Priority Data

Sep. 18, 1995 [JP] Japan ..................................... 7-263561

[51] Int. Cl.[6] ....................................................... H04N 5/45
[52] U.S. Cl. ........................ 348/565; 348/569; 348/588; 348/589
[58] Field of Search ..................................... 348/564, 565, 348/567, 569, 570, 588, 589, 731, 732; H04N 5/45

[56] References Cited

U.S. PATENT DOCUMENTS 5,452,012   9/1995  Saitoh ...................................... 348/569
5,708,475   1/1998  Hayashi ................................... 348/564

*Primary Examiner*—Sherrie Hsia
*Attorney, Agent, or Firm*—Jay H. Maioli

[57] ABSTRACT

When a program-scanning is executed, the scanning picture is displayed such that contents of the image can be reliably recognized while an image of the program that has been displayed so far is displayed on the picture screen. A television receiver has a function to display a sub-picture smaller than a main picture. When the television receiver enters a program-scanning mode, a broadcasting program or an image source whose image has been displayed on the whole picture screen of a display or whose image has been displayed as a main picture (41) is displayed on a sub-picture screen (42). Image of a plurality of broadcasting programs which result from changing the tuning state in the tuner are sequentially displayed on the main picture (41), thereby executing the program-scanning.

19 Claims, 14 Drawing Sheets

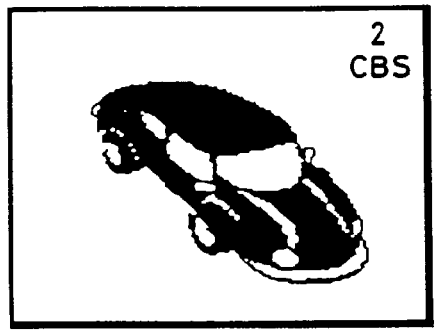
FIG. 7A
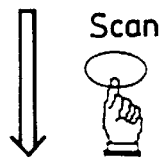
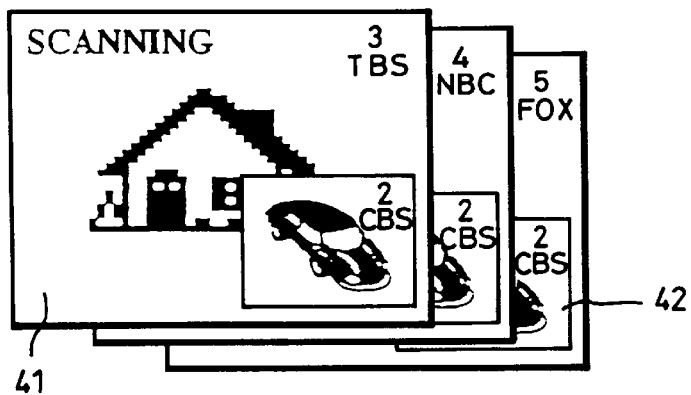
FIG. 7B
 
FIG. 7C
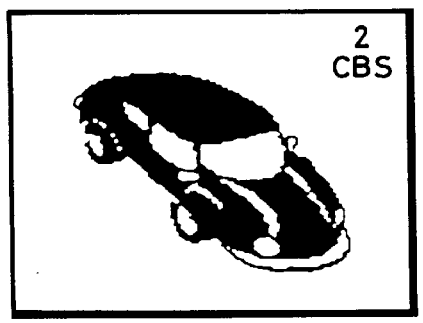
FIG. 7D
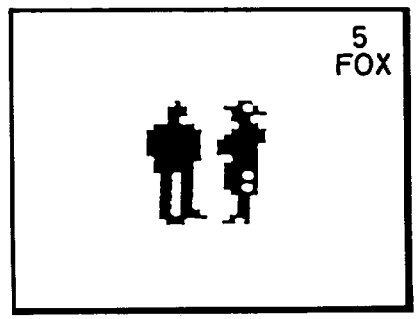

TELEVISION RECEIVER AND TUNING CONTROL METHOD INCLUDING A PROGRAM-SCANNING MODE

BACKGROUND OF THE INVENTION

The present invention relates to a television receiver and a tuning control method, and particularly to a program-scanning mode in which a viewer can scan broadcasting programs that are broadcasted when the viewer watches a broadcasting program.

Heretofore, as a television receiver for receiving an analog television broadcast wave of ground wave so that a viewer can watch a broadcasting program, there is a television receiver with a program-scanning mode by which a viewer can scan broadcasting programs that are available at that time.

A program-scanning mode displays broadcasting programs of channels on a picture screen of a television receiver at every predetermined time period by sequentially varying the tuning state of a television tuner from a channel corresponding to a broadcasting program that the viewer is watching at that time. In the case of ground wave television broadcasting, a transmission channel and a channel corresponding to a broadcasting program are agreed with each other, and therefore the channel corresponding to the broadcasting program will hereinafter be referred to as "channel" for brevity.

If a television receiver has a function to display a sub-picture screen on a part of a display screen and a main picture screen on the area other than the sub-picture screen and to display independent images on the sub-picture screen and the main picture screen, then such television receiver carries out a program-scanning by the use of the sub-picture screen and an image on the main picture screen is fixed to the channel of the present broadcasting program. Thus, the viewer can watch the main picture screen satisfactorily. The aforesaid function will hereinafter be referred to as "PinP (picture-in-picture) function" for brevity.

As described above, according to the above program-scanning system, in the television receiver without the PinP function or the television receiver with the PinP function which is not placed in the PinP mode, contents of image on the whole display screen are changed sequentially so that the broadcasting program that has been watched so far is erased from a visual field of the viewer.

Since the television receiver, which carries out program-scanning on the sub-picture screen by the PinP function, has to display images on the small sub-picture screen in order by the program-scanning, the contents of an image are difficult for the viewer to see. There is then the risk that the viewer will miss a broadcasting program that the viewer wants to select.

Most of the program-scanning is activated after a broadcasting program that the viewer is watching has ended or during a commercial in a broadcasting program is broadcasted. The program-scanning system of the above television receiver is of the type that the viewer has to start the program-scanning by operating a scan key. Therefore, each time the program-scanning is started, the viewer has to operate the scan key, which is very cumbersome.

SUMMARY OF THE INVENTION

In view of the aforesaid aspect, it is an object of the present invention to provide a television receiver and a tuning control method in which a viewer can reliably see the contents of image displayed on a picture screen by program-scanning so that the viewer will not miss a broadcasting program that the viewer wants to select.

It is another object of the present invention to provided a television receiver and a tuning control method in which a broadcasting program that has been watched so far until a program-scanning is activated can constantly be displayed on a picture screen during program-scanning.

It is a further object of the present invention to provide a television receiver and a tuning control method in which program-scanning can automatically be started during a broadcasting program which is being broadcasted or during a commercial which is being broadcasted after a broadcasting program has been finished.

According to a first aspect of the present invention, there is provided a television receiver in which independent images are respectively displayed on a sub-picture screen of a part of an image display area and a main picture screen of an image display area other than the sub-picture screen. This television receiver comprises first and second tuners for independently carrying out the tuning operations, signal processing means supplied with an output signal from the first or second tuner and processing the inputted output signal in such a way as to display the output signal on the sub-picture screen, synthesizing means for synthesizing the other output signal of the first and second tuners and an output signal from the signal processing means, switching means for selectively supplying the output signals of the first and second tuners to the signal processing means and the synthesizing means, and control means for controlling the switching means such that a video signal received at one tuner and displayed on the main picture screen is displayed on the sub-picture screen, and displaying a video signal on the main picture screen by sequentially changing a tuning channel of the other tuner.

According to a second aspect of the present invention, there is provided a method of controlling a tuning of a television receiver in which an image display area is divided into a main picture screen and a sub-picture screen on which independent images are displayed and a viewer is allowed to select a desired channel. The method comprises the steps of a first step for displaying a video signal, which is received at a first tuner and displayed on the main picture screen, as a sub-picture, a second step for displaying a video signal received at a second tuner as a main picture, and a third step for sequentially changing a channel selected by the second tuner at every predetermined time.

In accordance with a third aspect of the present invention, a television receiver in which an image display area is divided into a main picture screen and a sub-picture screen on which independent images are respectively displayed and a viewer is allowed to select a desired channel. This television receiver includes a first step for displaying a video signal, which is received at a first tuner and displayed on a main picture screen, on a sub-picture screen, a second step for displaying a video signal, which is received by a second tuner, on the main picture screen, and a third step for sequentially changing a channel selected by the second tuner at every predetermined time.

In the television receiver according to the present invention, when a program-scanning gets started, an image of a broadcasting program that has been watched so far by a viewer until the program-scanning is started continues being displayed as a sub-picture in the PinP mode, and images of broadcasting programs sequentially selected by the program-scanning are displayed on a main picture screen of the PinP mode in order.

Therefore, a broadcasting program that has been watched so far by a viewer until the program-scanning is started can be prevented from being erased from the picture screen. Furthermore, since images are sequentially displayed on the main picture screen by the program-scanning, the viewer can reliably see the contents of a broadcasting program and will not miss a broadcasting program that the viewer wishes to select.

BRIEF DESCRIPTION OF THE DRAWINGS

FIGS. 7A through 7D are pictorial representations showing a manner in which pictures displayed on the screen of the television receiver according to the present invention are changed in accordance with a proceeding of program-scanning;

DETAILED DESCRIPTION OF THE PREFERRED EMBODIMENTS

A television receiver and a tuning control method according to the present invention will be described below with reference to the drawings.

Figure 1A:
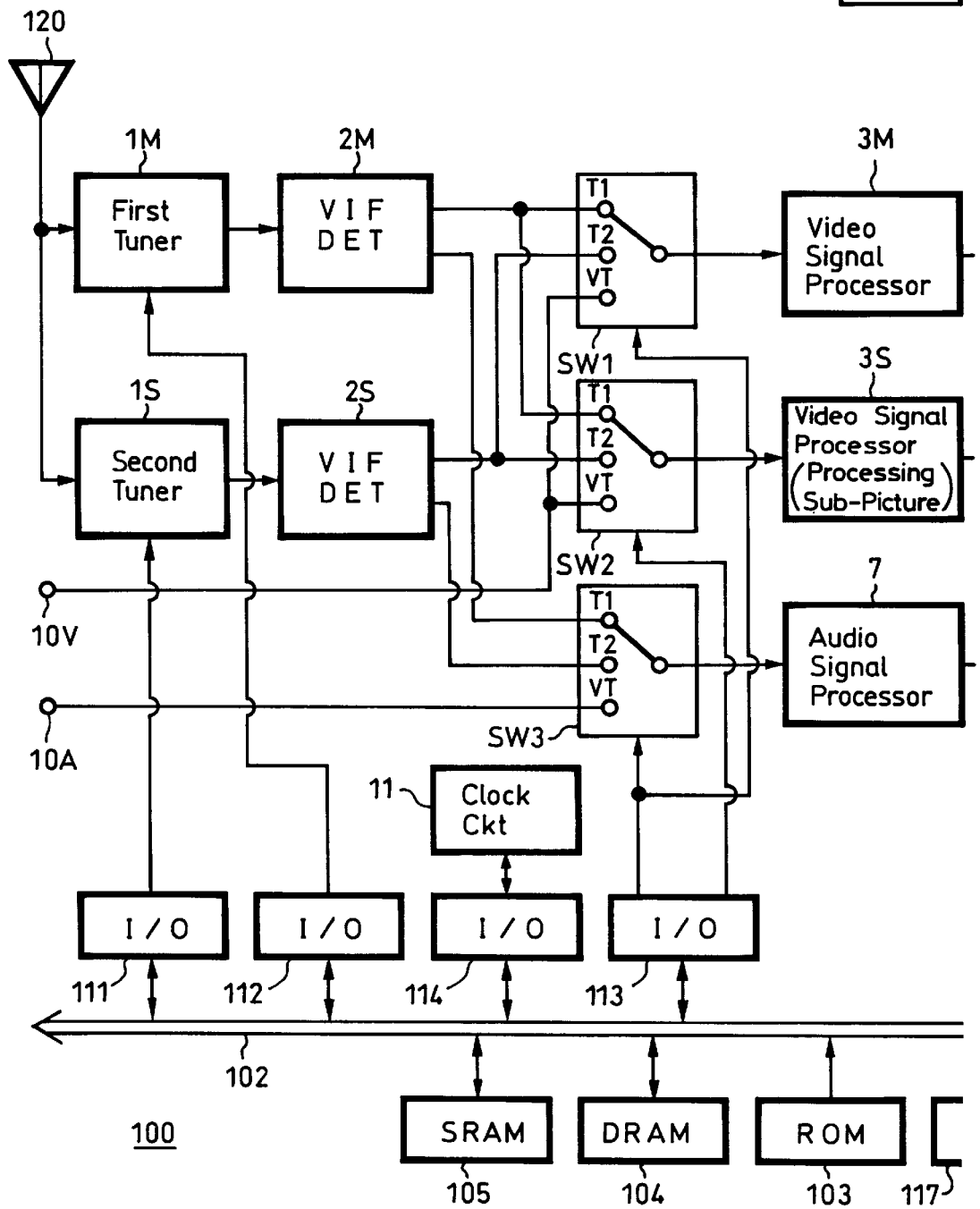
FIG. 1 (formed of FIGS. 1A and 1B drawn on two sheets of drawings to permit the use of a suitably large scale) is a block diagram showing a television receiver according to a first embodiment of the present invention.
Figure 1B:
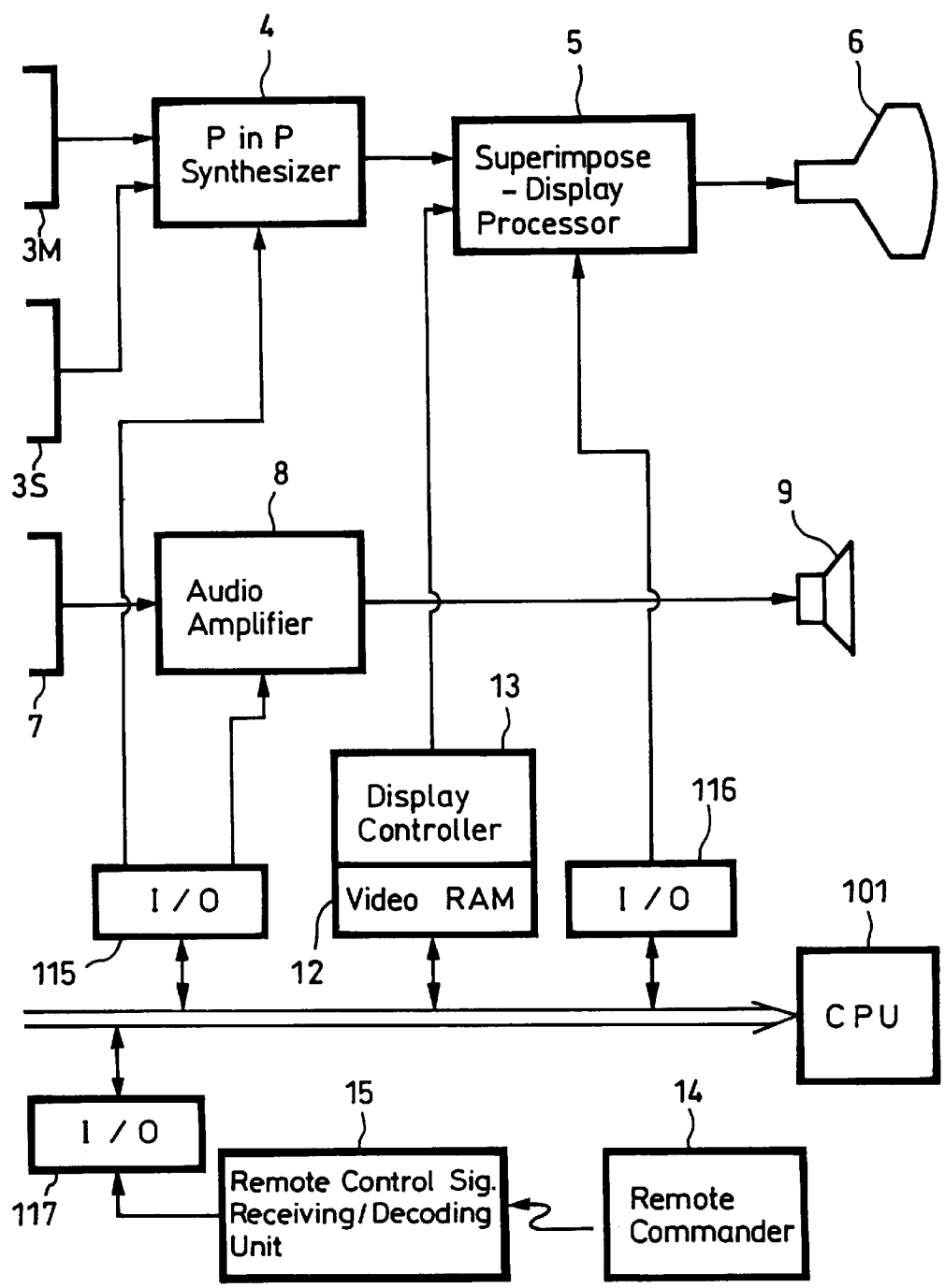

FIG. 1 (formed of FIGS. 1A and 1B with FIG. 1A to the left of and partly overlapping FIG. 1B) of the accompanying drawings shows in block form a television receiver according to a first embodiment of the present invention for receiving an analog television broadcast wave by using ground wave.

The television receiver according to this embodiment has a PinP function capable of displaying a sub-picture screen on a small area of a part of a display screen and is of a double-tuner type which has two tuners.

In FIG. 1, reference symbol 1M depicts a first tuner, and 1S a second tuner. A broadcast wave received at an antenna 120 is distributed and then supplied to the first and second tuners 1M, 1S. The first and second tuners 1M and 1S tune in a channel corresponding to a predetermined broadcasting program in response to a tuning control signal supplied thereto from a control circuit 100 (formed of a microcomputer) which will be described later on. In this embodiment, the television receiver receives ground wave broadcasting, and hence the above channel corresponding to the predetermined broadcasting program will simply be referred to as "channel".

The control circuit 100 generates a tuning control signal for tuning in a channel designated by a viewer in response to tuning information entered by a viewer when the viewer operates a tuning key on a remote control signal transmitter (hereinafter referred to as "remote commander") 14. Also, when the control circuit 100 detects that the viewer operates a program-scanning key, which will be described later on, of the remote commander 14, the control circuit 100 generates a tuning control signal for varying automatically and sequentially changing channels to be tuned in.

These tuners 1M, 1S convert the tuned-in broadcasting wave signals into video intermediate frequency signals and supply these video intermediate frequency signals to video intermediate frequency/detectors (VIF DET) 2M, 2S. The video intermediate frequency/detectors 2M, 2S amplify the intermediate frequency signals and demodulate a video signal and an audio signal.

A demodulated video signal from the video intermediate frequency/detector 2M is supplied to a first input terminal T1 of a switch circuit SW1 and a first input terminal T1 of a switch circuit SW2. The demodulated audio signal is supplied to a first input terminal T1 of a switch circuit SW3.

A demodulated video signal from the video intermediate frequency/detector 2S is supplied to a second input terminal T2 of the switch circuit SW1 and a second input terminal T2 of the switch circuit Sw2, and a demodulated audio signal is supplied to a second input terminal T2 of the switch circuit SW3.

A video signal from AV (audio-visual) devices serving as external input sources such as a VTR (video tape recorder) or a laser disk player is supplied to an external video input terminal 10V. This video signal from the external video input terminal 10V is supplied to a third input terminal VT of the switch circuit SW1 and a third input terminal VT of the switch circuit SW2. Further, an audio signal is supplied to a third input terminal VT of the switch circuit SW3 from an external input source through an external audio input terminal 10A.

The switch circuits SW1, SW2, SW3 are changed in position in response to switching signals supplied thereto from the control circuit 100.

The switch circuit SW1 selectively switches a video signal for displaying an image on the whole picture screen as a single picture and a video signal for displaying an image as a main picture in the PinP mode. A video signal from the switch circuit SW1 is supplied to a video signal processor 3M, in which it is processed in a predetermined manner with respect to a color video signal and supplied to a PinP synthesizer 4.

The switch circuit SW2 selectively switches a video signal for displaying an image as a sub-picture in the PinP mode. A video signal from the switch circuit SW2 is supplied through a video signal processor 3S to the PinP synthesizer 4. The video signal processor 3S reduces a picture size of an inputted video signal in order to display an image as a sub-picture in the PinP mode, and effects a processing similar to that of the video signal processor 3M.

A control signal is supplied to the PinP synthesizer 4 from the control circuit 100. When the control signal from the control circuit 100 indicates the display in the PinP mode, the PinP synthesizer 4 synthesizes the video signals from the video signal processors 3M, 3S in such a manner that the video signal from the video signal processor 3M is displayed as a main picture and the video signal from the video signal processor 3S is displayed as a sub-picture together with the main picture. When the control signal from the control circuit 100 indicates that the display in the PinP mode is not effected, the PinP synthesizer 4 outputs the video signal from the video signal processor 3M as it is, thereby displaying the video signal from the video signal processor 3M as a single image on the whole picture screen of the television receiver.

The video signal from the PinP synthesizer 4 is supplied to a superimpose-display processor 5. The superimpose-display processor 5 is supplied with signals such as signals indicative of characters or graphics which will be described later on. The superimpose-display processor 5 is responsive to a control signal from the control circuit 100 to display a channel (channel number and broadcasting station name) superimposed upon the picture and to display characters, graphics and symbols indicating the operation state of the television receiver such as volume displayed in the form of a bar, alarm mark or the like superimposed upon a displayed picture.

According to the first embodiment, the superimpose-display processor 5 displays menu pictures for implementing various settings such as a broadcasting channel to be program-scanned or a scanning time based on a control signal supplied thereto from the control circuit 100.

The superimpose-display processor 5 generates data of characters, graphics and symbols to be displayed on the picture screen under control of the control circuit 100 as will be described later on.

A video signal from the superimpose-display processor 5 is supplied to a CRT (cathode-ray tube) display 6 which displays on its picture screen a color image of a broadcasting program received at the first and second tuners 1M, 1S and a color image based on the video signal supplied thereto from the AV device such as the external input source through the input terminal 10V.

The switch SW3 selectively switches a broadcasting program selected by the switch circuit SW1 so that an image is displayed as a single picture or a sub-picture and the audio signal from the external input source. Accordingly, the switch circuit SW3 is changed in position in unison with the switch circuit SW1.

The audio signal from the switch circuit SW3 is supplied through an audio processor 7 to an audio amplifier 8 and reproduced by a speaker 9. In this embodiment, the audio amplifier 8 controls volume and quality of reproduced sounds in response to a control signal from the control circuit 100.

The television receiver according to the first embodiment has a so-called main picture/sub-picture changing function, and hence the remote commander 14 includes a main picture/sub-picture changing key. If the viewer presses this main picture/sub-picture changing key, then the switched state of the switch circuit SW1 is changed to the state of the switch circuit SW2, and also the switched state of the switch circuit SW2 is changed to the state of the switch circuit SW1 under control of the control circuit 100. The switch circuit SW3 is switched in unison with the switch circuit SW1 as mentioned hereinbefore.

Accordingly, the image of the broadcasting program that has been displayed on the main picture screen so far is moved to and displayed on the sub-picture screen, and the image of the broadcasting program that has been displayed so far on the sub-picture screen is displayed on the main picture screen, thereby the main picture and the sub-picture being changed.

The switch circuits SW1, SW2 can be switched independently, and accordingly, in the PinP mode, the video signal from the same broadcasting program or the same source can be selected on the main picture screen and the sub-picture screen by the switch circuits SW1, SW2.

The control circuit 100 will be described below. If a main power-supply switch of this television receiver is turned on under the condition that the television receiver according to this embodiment is connected to an AC plug socket, then the power-switch of this television receiver can be turned on and off by the remote commander 14. Under the condition that the main power-supply switch is turned on, the control circuit 100 is constantly placed in the operative state.

As mentioned hereinbefore, the control circuit 100 includes the microcomputer, and a CPU (central processing unit) 101, a ROM (read-only memory) 103, a DRAM (dynamic random-access memory) 104 and a SRAM (static random-access memory) 105 are connected to a system bus 102. Further, a plurality of I/O ports 111 to 117 are connected to the system bus 102 through which various signals are inputted and outputted.

A tuning control signal is supplied to the first tuner 1M from the control circuit 100 through the I/O port 112. A tuning control signal is supplied to the second tuner 1S from the control circuit 100 through the I/O port 111. Switching control signals are supplied to the switch circuits SW1, SW2, SW3 from the control circuit 100 through the I/O port 113.

A clock circuit counts a present time and is served as a timer for generating an interrupt timing signal when a program of the ROM 103 is activated by an interrupt signal and a timer for measuring a scanning period of program-scanning and a duration of a program-scanning mode. This clock circuit 11 is constantly energized by a power-supply voltage even when the power-supply switch of the television receiver is turned off. In this embodiment, although not shown, the clock circuit 11 is energized by a power supply voltage supplied from other power-supply source such as a battery or a rechargeable battery. Time information and timer information from the clock circuit 11 are stored in the control circuit 100 through the I/O port 114 and the system bus 102.

Further, if the CPU 101 executes the program, then the time of the clock circuit 11 is corrected. The clock circuit 11 affords not only information indicative of time, minute, second but also information indicative of year, month, date and day.

Corresponding control signals are supplied through the I/O port 115 to the PinP synthesizer 4 and the audio amplifier 8.

A superimpose-display control signal is supplied to the superimpose-display processor 5 through the I/O port 116. As examples of superimposed display, there are enumerated the display of the channel number for indicating a switched channel when the channel is switched, the display of present reception channel, the display for displaying volume in the form of bar and the display of the set menu.

In order to execute the superimpose display, the video RAM 12 is connected to the system bus 102. Character information and symbol information generated from the control circuit 100 by use of character information stored in the ROM 103 are temporarily stored in the video RAM 12 and supplied through a display controller 13 to the superimpose-display processor 5 as information for superimposing respective items on the picture screen under program control of the CPU 101.

Font data and image data of characters and symbols necessary for the superimpose-display are stored in the ROM 103. Font data and image data of necessary characters and symbols are read out from the ROM 103 in accordance with a program under control of the CPU 101, transferred to an arbitrary address of the video RAM 12 and supplied through the display controller 13 to the superimpose-display processor 5, wherein the image data in the video RAM 12 is synthesized with the video signal and displayed on the picture screen of the CRT display 6 during a proper period of time.

In the superimpose-display, information is processed by a so-called overlay processing such as superimpose, and displayed on the picture screen of the CRT display 6.

The DRAM 104 is mainly used as a work area for computation. The SRAM 105 is used as a last memory for memorizing the latest channel and volume thus set of the broadcasting program that has been watched so far by the viewer. Further, the SRAM 105 is used as a memory area for storing channel information set as a program-scanned channel, which will be described later on, a program-scanning time and other setting information. In the case of this embodiment, the SRAM 105 is of a nonvolatile memory whose power is backed-up by batteries. Therefore, even when the power-supply switch of the television receiver is turned off, the contents stored in the SRAM 105 are backed up and can be prevented from being erased.

In the television receiver according to this embodiment, various control operations are executed by the remote commander 14, i.e., in a so-called wireless fashion. When a remote control signal of infrared rays is generated from the remote commander 14, the remote control signal is received at a remote control signal receiving/decoding unit 15 of the television receiver side. The thus received remote control signal is decoded by the remote control signal receiving/decoding unit 15 and a decoded signal from the remote control signal receiving/decoding unit 15 is supplied through the I/O port 117 to the system bus 102.

Figure 2:
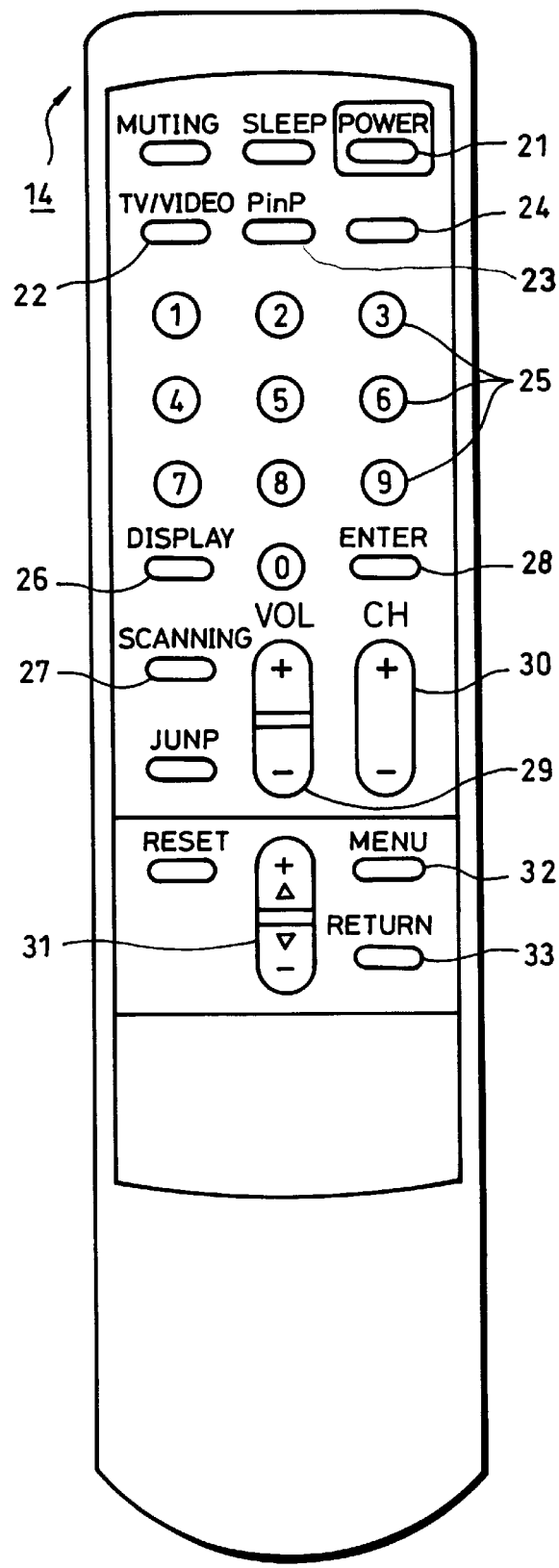
FIG. 2 is a front view illustrating an appearance of a remote commander used in the television receiver according to the first embodiment of the present invention.

FIG. 2 is a front view illustrating an appearance of the remote commander 14. The remote commander 14 according to this embodiment includes, as operation keys, a power-supply key 21, a tuner/external input switching key 22, a PinP key 23, a main picture/sub-picture changing key 24, a ten key 25, a channel-display key 26 for determining whether or not a channel number and a broadcasting station name are to be displayed on the picture screen, a program-scanning key 27, an enter key 28, a volume key 29, a main picture channel sequential selection key 30, a sub-picture channel sequential selection key 31, a menu key 32 for reading out various setting pictures, a return key 33, etc. The sub-picture channel sequential selection key 31 is operated as an operation key for selecting a desired set menu picture from a variety of set menu pictures when a viewer presses the menu key 32 and various set menu pictures are displayed on the picture screen of the display 6.

The CPU 101 interprets the remote control signal supplied thereto through the I/O port 117 and controls a tuning-in of a channel corresponding to a broadcasting program, a volume, a PinP synthesizing, a superimpose-display, a switching of the switches SW1 to SW3 and a program-scanning.

When the tuner (TV) is selected by the key 22, the switch circuit SW1 is connected to the input terminal T1 or T2, e.g., the input terminal T1, and the switch circuit SW2 is connected to the other side of the input terminal T1 or T2, e.g., the input terminal T2. Since the switch circuit SW3 is switched in unison with the switch circuit SW1, the switch circuit SW3 is connected to the input terminal T1.

At that time, unless the PinP function is selected by the PinP key 23, then a program of a channel tuned-in by the first tuner 1M or the second tuner 1S selected by the switch circuit SW1, in this case, the first tuner 1M is displayed on the picture screen of the display 6 as a single image.

At that time, if the viewer executes a direct tuning by the ten key 25 or presses the main picture channel sequential selection key 30, then the tuning state of the first tuner 1M is changed so that the program, which is displayed on the picture screen of the display 6, can be changed to other channel.

Under this state, if the viewer selects the PinP function by the PinP key 23, then an image of a program tuned-in by the first tuner 1M selected by the first switch circuit SW1 is displayed on the picture screen of the display 6 as a main picture and an image of a program tuned-in the second tuner 1S selected by the switch circuit SW2 is displayed on the picture screen of the display 6 as a sub-picture.

In this case, the viewer can change the channel of the broadcasting program displayed as the main picture by directly tuning-in the channel with the ten key 25 or by pressing the main picture channel sequential selection key 30. Further, the viewer can change the channel of the broadcasting program displayed as the sub-picture by pressing the sub-picture channel sequential selection key 31.

Under this state, if the viewer presses the main picture/sub-picture change key 24, then the switched state of the switch circuit SW1 and the switched state of the switch circuit SW2 are replaced with each other, whereby the image of the program tuned-in by the second tuner 1S is displayed on the picture screen of the display 6 as a main picture and the image of the program tuned-in by the first tuner 1M is displayed on the picture screen of the display 6 as a sub-picture, respectively. Thus, the contents of the main picture screen and the sub-picture screen are replaced with each other.

If on the other hand the viewer selects the external input source by pressing the key 22, the switch circuits SW1, SW3 are connected to the input terminals VT. At that time, the switched state of the switch circuit SW2 is not changed. Accordingly, an image of the video signal from the external video input terminal 10V is displayed on the picture screen of the display 6 as a single image. Alternatively, such an image of the video signal from the external video input terminal 10V is displayed on the picture screen of the display 6 as a main picture in the case of the PinP mode. At that time, the viewer can change the channel of the broadcasting program that is displayed as a sub-picture by pressing the sub-picture channel sequential selection key 31.

Under this state, if the viewer presses the main picture/sub-picture change key 24, then the switched state of the switch circuit SW1 and the switched state of the switch circuit SW2 are replaced with each other, whereby an image of the external video signal is displayed on the sub-picture screen of the display 6. Then, the video signal from the first tuner 1M or the second tuner 1S that has been selected by the switch circuit SW2 is selected by the switch circuit SW1 and then displayed as the main picture. In this case, the viewer can change the channel of the broadcasting program displayed as the main picture by direct-tuning with the ten key 25 or by pressing the main picture channel sequential selection key 30.

In the case of the first embodiment, the viewer can place the television receiver in the program-scanning mode by pressing the program-scanning key 27 even under the condition that the television receiver is not placed in the PinP mode, i.e., a single image is displayed on the picture screen of the display 6 or under the condition that the main picture and the sub-picture are displayed on the picture screen of the display 6 in the PinP mode.

If the television receiver is not in the PinP mode when the viewer presses the program-scanning key 27, then the television receiver is forced to be placed in the PinP mode, and the switch circuit SW2 is switched under control of the control circuit 100 in such a manner as to select the broadcasting program or the external input source that has been watched so far by the viewer until the television receiver is placed in the PinP mode. As a result, the image of the broadcasting program or the external input source that has been watched so far by the viewer until the television receiver is placed in the PinP mode is saved in and displayed on the sub-picture screen.

If the switched state of the switch circuit SW2 is switched so that the switch circuit SW2 selects the first tuner 1M or the second tuner 1S, then the switch circuit SW1 is switched so as to select the other of the first tuner 1M or the second tuner 1S. Then, the tuning control signal for sequentially varying the tuning channel at a predetermined channel changing period, which will be described later on, is supplied from the control circuit 100 to the tuner selected by the switch circuit SW1, thereby executing the program-scanning.

If the external input source is selected after the switch circuit SW2 was switched in order to save the image of the broadcasting program or the external input source that has been watched so far by the viewer until then, then the switch circuit SW1 is switched so as to select the first tuner 1M or the second tuner 1S, e.g., the first tuner 1M. Then, the tuning control signal for sequentially changing the tuning channel is supplied from the control circuit 100 to the first tuner 1M selected by the switch circuit SW1, thereby executing the program-scanning.

If the television receiver is in the PinP mode when the viewer presses the program-scanning key 27, then the switch circuit SW2 is forced to be switched so as to select the broadcasting program or the external input source that has been watched so far by the viewer, whereby the image of the broadcasting program or the external input source that has been displayed so far on the main picture screen is saved in and displayed on the sub-picture screen. Similarly to the case that the television receiver is not in the PinP mode, the switch circuit SW1 selects the first tuner 1M if the source of the image displayed on the sub-picture screen is the external input source. Also, the switch circuit SW1 selects the tuner, which is not selected for the sub-picture if the above-mentioned source is not the external input source.

Then, the tuning control signal for sequentially changing the tuning channel at the predetermined channel changing period is supplied from the control circuit 100 to the tuner selected by the switch circuit SW1, thereby executing the program-scanning.

According to the first embodiment, in the program-scanning mode, the channel number and the broadcasting station name, if the broadcasting station name is stored in the SRAM 105 in response to the channel number, are displayed on the images that are sequentially displayed on the main picture at the predetermined channel changing period. The channel number of the broadcasting station that has been so far watched by the viewer until now and the broadcasting station name also are similarly displayed on the sub-picture. Thus, the viewer can recognize the channel of the tuned-in broadcasting program and broadcasting station name based on not only the contents of picture but also the channel number and the broadcasting station name by the program-scanning.

In the first embodiment, the viewer can previously set a program-scanned broadcasting channel so that only the thus set channel can be program-scanned. As will be described later on, when the viewer sets a program-scanned broadcasting channel, the viewer selects program-scanned channel numbers on the setting picture and arranges the program-scanned channel numbers on the setting picture in the order of program-scanning. When one or a plurality of program-scanned broadcasting channels are set, in the program-scanning mode, the control circuit 100 scans only more than one set broadcasting channel in the setting order if the television receiver is placed in the program-scanning mode.

If the viewer does not set a program-scanned channel, then, the control circuit 100 sequentially scans all channels that can be viewed in the sequential order of low reception frequencies, for example.

In the first embodiment, the channel changing period in the program-scanning mode is a predetermined time period and this time period of the channel changing period may be changed and set by the viewer. Therefore, it becomes possible for the viewer to set a time period in which an image of one broadcasting channel is displayed on the main picture screen when the television receiver is in the program-scanning mode. As a consequence, the viewer can freely set a time period for confirming the contents of the program.

Further, in the first embodiment, if the viewer presses the program-scan key 27 of the remote commander 14 once in the mode other than the program-scanning mode, then the program-scanning mode is started. Then, if the viewer presses the program-scan key 27 one more time in the program-scanning mode, then the program-scan mode is stopped. Even when the program-scan key 27 is not pressed twice, if a predetermined duration of the program-scanning mode is passed, then the program-scanning mode is ended automatically, and the television receiver is returned to the state presented before the program-scanning mode is started. The duration of the program-scanning mode can be arbitrarily set and varied by the viewer.

In the program-scanning mode, if the viewer presses the enter key 28, then the program-scanning is stopped in the channel displayed on the main picture screen at the timing in which the enter key 28 is pressed, and the channel displayed when the enter key 28 is pressed is kept being displayed as a main picture or as a single picture. Specifically, in the program-scanning mode, when the viewer finds out a desired program that the viewer wishes to watch next, the viewer can tune in the broadcasting program by pressing the enter key 28.

The viewer can set a channel, a channel changing period and a duration of the program-scanning mode on the set menu panels of respective set values of the program-scanning. The viewer can select the set menus panels of set values of the program-scanning from the list of menu displayed when the viewer presses the menu key 32 of the remote commander 14.

When the viewer selected the set menu panel of respective set values for the program-scanning, the control circuit 100 generates display information of the set menu panel of respective set values for the program-scanning by use of the ROM 103 and the video RAM 12 and displays the set menu panel of respective set values for the program-scanning on the picture screen of the display 6 through the display controller 13 and the superimpose-display processor 5.

On the set menu panel of respective set values for the program-scanning, the viewer can set the program-scanned channel, the channel changing period and the duration of the program-scanning mode, and the respective set values are stored in the SRAM 105. Recommended values of defaults are previously set in the channel changing period and the duration of the program-scanning mode so that the viewer can change the respective set values to the values changed from the recommended values if necessary.

A manner in which the television receiver is operated in the program-scanning mode under control of the control circuit 100 will be described more with reference to flowcharts of FIGS. 3 to 5.

Figure 3:
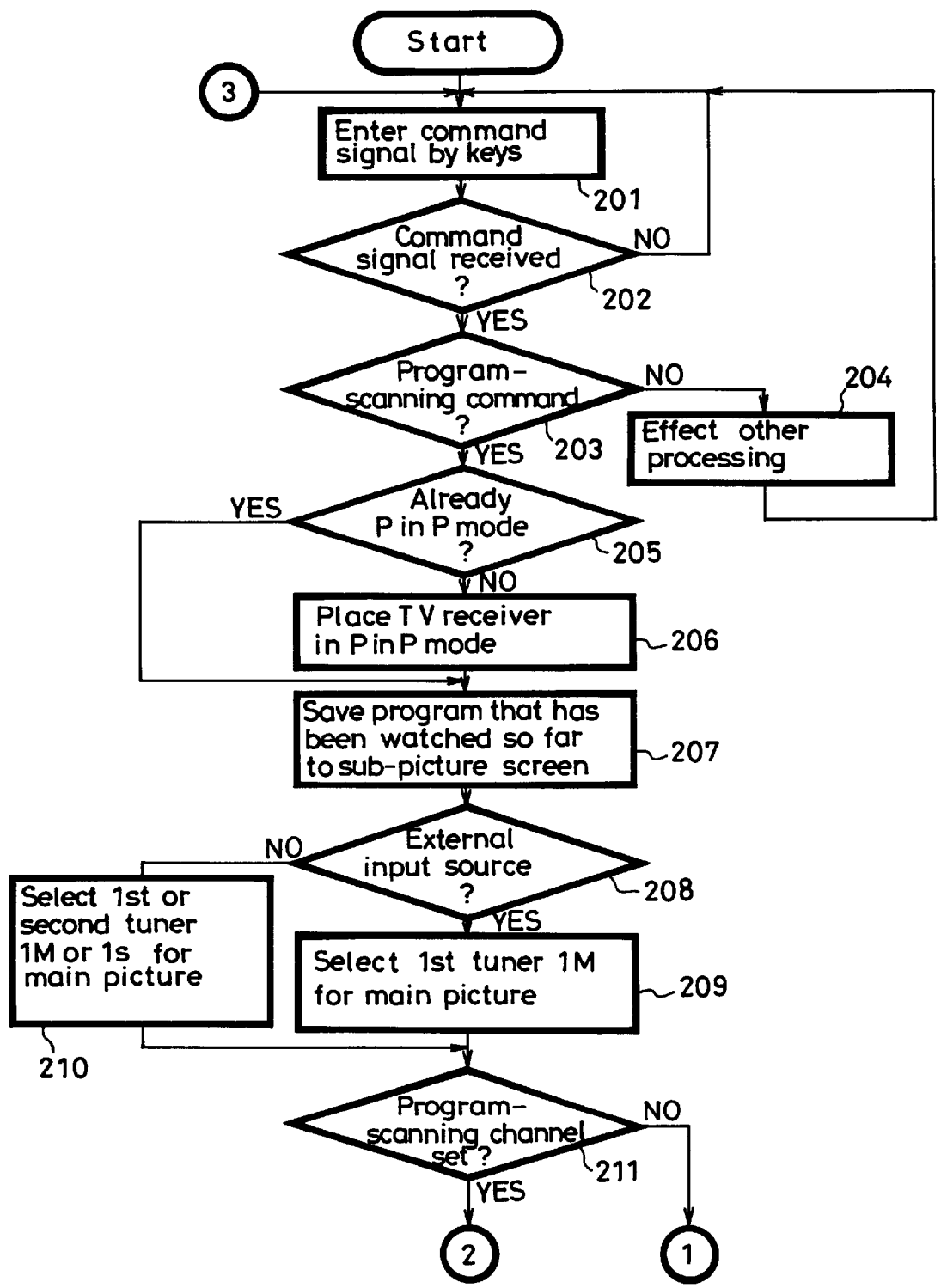
FIG. 3 is a flowchart to which reference will be made in explaining a manner in which the television receiver is placed in the program-scanning mode under control of a control circuit.

Referring to FIG. 3, following the start of operation, at a step 201, the television receiver awaits information entered when the viewer operates the keys of the remote commander 14. It is determined at the next decision step 202 whether or not a remote control command entered by operating the keys of the remote commander 14 is received. If a YES is outputted at the decision step 202, then control goes to the next decision step 203, whereat it is determined whether or not the received command is a program-scanning command. If the received command is not the program-scanning command as represented by a NO at decision step 203, then control goes to step 204. In the step 204, other processing corresponding to that command is effected, and control goes to the step 201, whereat the television receiver is placed in the state awaiting information entered by the viewer when the viewer operates the keys of the remote commander 14.

If the received command is the program-scanning command as represented by a YES at the decision step 203, then control goes to the next decision step 205, whereat it is determined whether or not the television receiver was already placed in the PinP mode. If the television receiver is placed in the PinP mode as represented by a YES at the decision step 205, then control goes to step 207. If on the other hand the television receiver is not placed in the PinP mode as represented by a NO at decision step 205, then control goes to a step 206, whereat the television receiver is placed in the PinP mode, and control goes to a step 207.

In the step 207, as mentioned before, the switch circuit SW2 is switched such that the broadcasting program or the external input source that has been watched so far by the viewer as a single picture or a main picture is saved in the sub-picture screen. Then, control goes to a decision step 208, whereat it is determined whether or not the picture that has been watched so far by the viewer as the single picture or the main picture is the video signal from the external input source such as a VTR. If the picture is based on the video signal from the external input source as represented by a YES at decision step 208, then control goes to step 209, whereat the switch circuit SW1 is switched so as to select the first tuner 1M relative to the main picture. If on the other hand the picture is not based on the video signal from the external input source as represented by a NO at the decision step 208, then control goes to step 210, whereat the switch circuit SW1 is switched so as to select the tuner, which is not selected for the sub-picture, from the first tuner 1M and the second tuner 1S for the main picture.

Following the step 209 or 210, control goes to a next decision step 211, whereat it is determined whether or not the program-scanned channel is set. This judgement is executed by checking a flag because a setting flag is registered in the DRAM 104 when the program-scanned channel is set.

Figure 4:
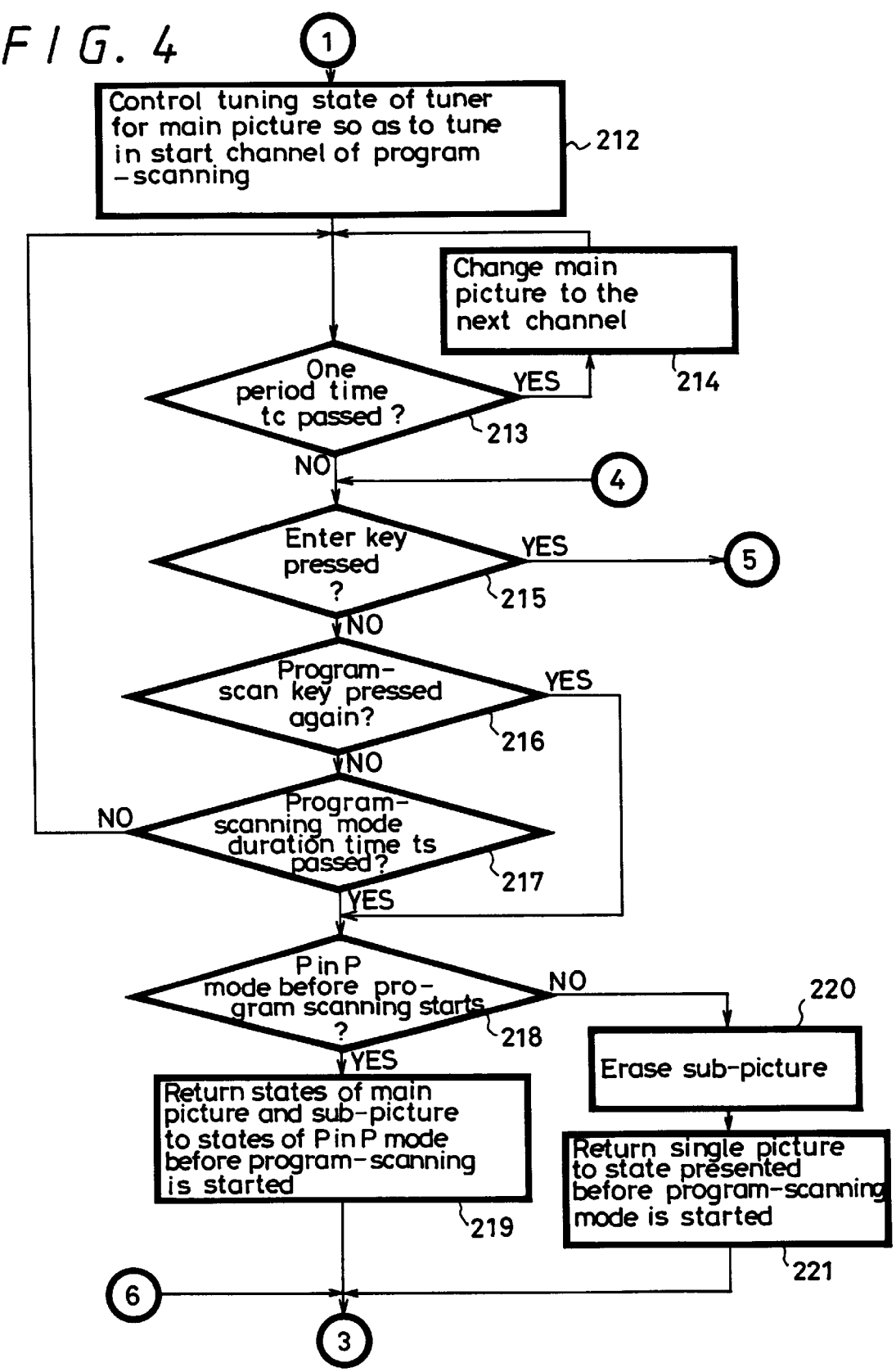
FIG. 4 is a flowchart to which reference will be made in explaining a manner in which the television receiver is placed in the program-scanning mode under control of a control circuit.

If the program-scanned channel is not set as represented by a NO at decision step 211, then control goes to a flowchart shown in FIG. 4, wherein the channel-selection state of the tuner relative to the main picture is controlled so as to tune in the start channel of the program-scanning (at step 212).

If the picture that has been watched so far on the picture screen of the display 6 by the viewer as a single picture or a main picture is a video signal from the external input source, then the start channel of the program-scanning is set to a channel whose reception frequency is lowest for example. Further, if the picture that has been watched so far on the picture screen of the display 6 by the viewer as a single picture or a main picture is a program of a broadcasting channel tuned in by the first tuner 1M or the second tuner 1S, then the start channel of the program scanning is set to a channel whose reception frequency is higher than that of the above broadcasting channel. In the program-scan mode, information indicative of the program-scanning mode, e.g., characters "SCANNING" is displayed on the main picture.

Thereafter, control goes to the next decision step 213, whereat it is determined whether or not a time tc of channel changing one period stored in the SRAM 105 as a channel changing period is passed. Specifically, the time tc of the channel changing one period is read out from the SRAM 105, and set in a timer of the clock circuit 11, wherein it is determined by the timer whether or not the time tc is passed.

If the time tc of the channel changing one period is passed as represented by a YES at decision step 213, then control goes to a step 214, whereat the next scanning channel is tuned in.

If there is another broadcasting channel whose reception frequency is higher than that of the broadcasting channel that has been displayed on the picture screen of the display 6 as the main picture, then the tuning state of the tuner relative to the main picture is controlled in such a manner that such a channel is tuned in as the next scanning channel. If there is not a channel whose reception frequency is higher than that of the above-mentioned channel, then the next scanning channel is returned to a channel whose reception frequency is lowest.

After the tuning state of the next scanning channel has been determined and the next scanning channel has been displayed in the main picture, control goes back to the step 213, whereat it is again determined whether or not the time tc of the channel change one period has passed.

If on the other hand the time tc of the channel changing period has not passed as represented by a NO at the decision step 213, then control goes to the next decision step 215, whereat it is determined whether or not the enter key 28 has been pressed. If the enter key 28 is not pressed as represented by a NO at the decision step 215, then control goes to the next decision step 216, whereat it is determined whether or not the program-scan key 27 is pressed again.

If the program-scan key 27 is pressed again as represented by a YES at the decision step 216, then control goes to a decision step 218, whereat it is determined whether or not the television receiver is placed in the PinP mode before the program-scanning has started as will be described later on. If on the other hand the program-key 27 is not pressed again as represented by a NO at the decision step 216, then control goes to a next decision step 217, whereat it is determined whether or not a time ts stored in the SRAM 105 as a program-scanning mode duration time has passed.

When the duration time ts of the program-scanning mode is judged in the decision step 217, the program-scanning mode duration time ts is read out from the SRAM 105 and set in the timer of the clock circuit 11, wherein it is determined by the timer whether or not the duration time ts of the program-scanning mode has passed.

If it is determined at the decision step 217 that the duration time ts of the program-scanning mode has not passed yet, then control goes back to the decision step 213, whereat it is determined whether or not the time tc of the channel changing one period has passed. If on the other hand the duration time ts of the program-scanning mode is passed as represented by a YES at the decision step 217, then control goes to the steps 218 to 221, wherein the program-scanning mode has stopped.

Specifically, it is determined at the decision step 218 whether or not the television receiver is placed in the PinP mode before the program-scanning has started. If the previous state of the television receiver is the PinP mode as represented by a YES at the decision step 218, then control goes to a step 219, whereat the tuning states of the tuners 1M, 1S and the switched states of the switch circuits SW1 to SW3 are controlled in such a manner that the main picture and the sub-picture are returned to the states of the PinP mode presented before the program-scanning is started, and then the program-scanning mode is ended. Thereafter, control goes back to the step 201, whereat the television receiver is placed in the state for awaiting the input of the command signal.

If on the other hand the state before the program-scanning is started is not the PinP mode as represented by a NO at the decision step 218, then control goes to a step 220, whereat the sub-picture is erased, and control goes to a step 221. In the step 221, the single picture is returned to the state presented before the program-scanning has started. Thereafter, control goes back to the step 201, whereat the television receiver is placed in the state for awaiting the input of the command.

Figure 5:
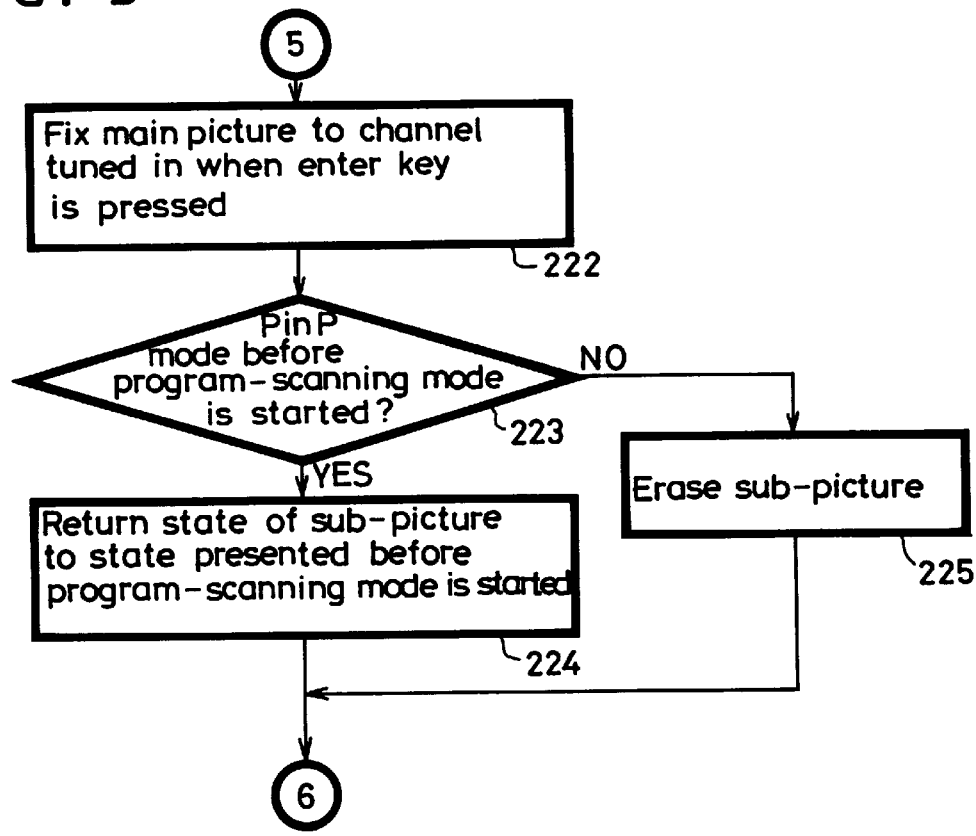
FIG. 5 is a flowchart to which reference will be made in explaining a manner in which the television receiver is placed in the program-scanning mode under control of a control circuit.

If the enter key 28 is pressed as represented by a YES at the decision step 215, then the program-scanning mode has ended, and control goes to a step 222 in FIG. 5, wherein a main picture is fixed to the channel tuned in when the enter key 28 is pressed.

Then, control goes to the next decision step 223, whereat it is determined whether or not the television receiver is placed in the PinP mode before the program-scanning mode is started. If the previous state of the television receiver is the PinP mode as represented by a YES at decision step 223, then control goes to a step 224, whereat the tuning states of the first and second tuners 1M, 1S and the switched state of the switch circuit SW2 are controlled in such a manner that the state of the sub-picture is returned to the state presented before the program-scanning mode is started. Thereafter, control goes back to the step 201, whereat the television receiver is placed in the mode for awaiting the input of the command signal. If on the other hand the television receiver is not placed in the PinP mode before the program-scanning mode is started as represented by a NO at the decision step 223, then control goes to a step 225, whereat the sub-picture is erased, and control goes back to the step 201, whereat the television receiver is placed in the mode for awaiting the input of the command.

Figure 6:
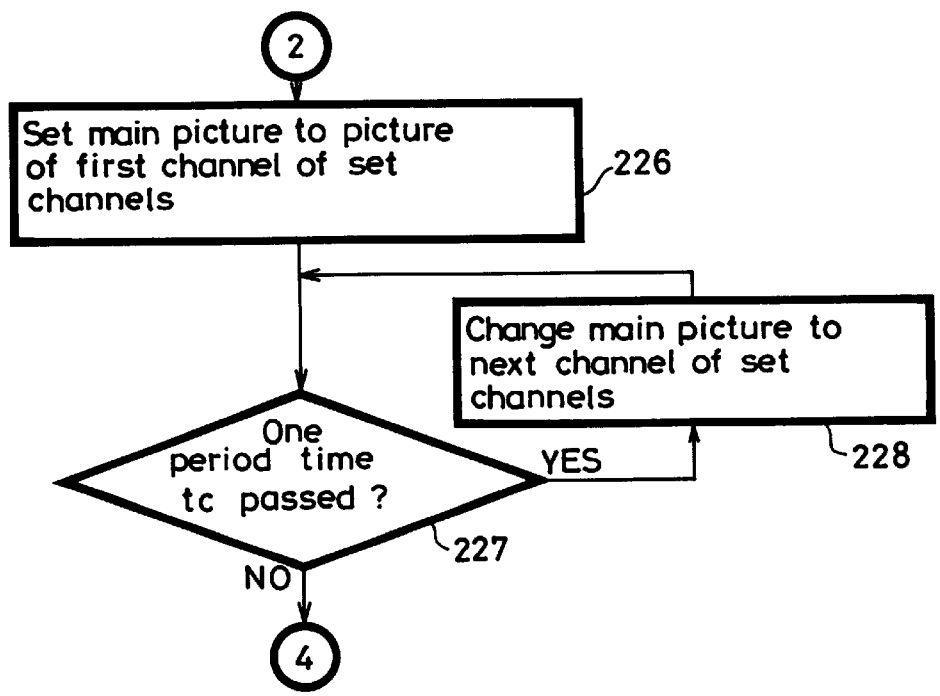
FIG. 6 is a flowchart to which reference will be made in explaining a manner in which the television receiver is placed in the program-scanning mode under control of a control circuit.

Referring back to FIG. 3, if it is determined at the decision step 211 that the program-scanning channel is set, then control goes to a step 226 in FIG. 6, wherein the tuning state of the tuner with respect to the main picture is controlled in such a manner that a channel set as a channel to be tuned in first from one or a plurality of channels set as the program-scanned channels is displayed as a main picture.

Thereafter, control goes to the next decision step 227, whereat it is determined similarly to the step 213 whether or not the time tc of the channel changing one period has passed. If the time tc of the channel changing one period has passed as represented by a YES at the decision step 227, then control goes to a step 228, whereat the tuning state of the tuner with respect to the main picture is controlled in such a manner that a broadcasting channel whose order is set as a channel to be program-scanned is selected from one or a plurality of channels set as program-scanned channels. Thereafter, control goes back to the step 227, whereat it is determined whether or not the time tc of the channel changing one period has passed.

If on the other hand it is determined at the decision step 227 that the time tc of the channel changing one period has not yet passed, then control goes to the step 215, whereafter the steps 215 to 225 are repeated.

Typical examples of the above-mentioned program-scanning will be described with reference to examples in which the displayed state on the picture screen of the display 6 is changed each time the program-scanning is executed.

FIGS. 7A through 7D show a manner in which pictures on the picture screen of the display 6 are changed by pressing the program-scan key 27 under the condition that the viewer watches the television picture screen on which a single picture is displayed. In the case of this embodiment, a program-scanned channel is not set, and a channel of the next broadcasting station whose reception frequency is higher than that of the broadcasting program that has been watched so far by the viewer has started being scanned.

Specifically, FIG. 7A shows a manner in which the viewer watches a single picture of a broadcasting program in which a channel number is "2" and a name of broadcasting station is "CBS". Under this state, if the viewer presses the program-scan key 27, as shown in FIG. 7B, an image that has been watched so far by the viewer is saved in a sub-picture 42. At this time, the channel number and the name of broadcasting station of the saved broadcasting program are displayed on the upper right of the sub-picture 42 as shown in FIG. 7B.

Under control of the control circuit 100, characters "SCANNING" indicating the program-scanning mode and images of broadcasting programs tuned in by the program-scanning are sequentially displayed on the main picture 41 at every time tc of one period of the channel changing period. Also, channel numbers of broadcasting programs and the names of broadcasting stations are displayed on the upper right of the main picture 41 as shown in FIG. 7B. At that time, since the channels are program-scanned in the order of channels with lower reception frequencies, the displayed states of the channels and the name of the broadcasting station in the main picture 41 are sequentially changed at every channel changing period as shown in FIG. 7B.

During the program-scanning mode, if the viewer presses again the program-scan key 27 of the remote commander 14, then the program-scanning mode will end, and as shown in FIG. 7C, the picture is returned to the original picture shown in FIG. 7A.

During the program-scanning mode, if the viewer presses the enter key 28 of the remote commander 14, then the sub-picture is erased as shown in FIG. 7D, and the tuning is controlled such that the state of the picture is fixed to the state of the main picture displayed when the enter key 28 is pressed, whereafter the program-scanning mode has ended.

FIGS. 8A through 8D show a manner in which pictures are changed when the viewer presses the program-scan key 27 under the condition that the viewer watches a picture on the picture screen of the display 6 while the television receiver is placed in the PinP mode. In the case of this embodiment, program-scanned channels are previously set and only a plurality of set channels are scanned sequentially.

Figure 8A:
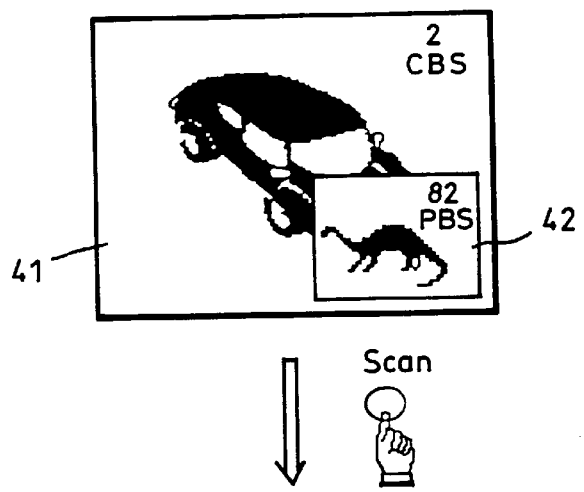
FIGS. 8A through 8D are pictorial representations showing a manner in which pictures displayed on the screen of the television receiver according to the present invention are changed in accordance with a proceeding of program-scanning.
Figure 8B:
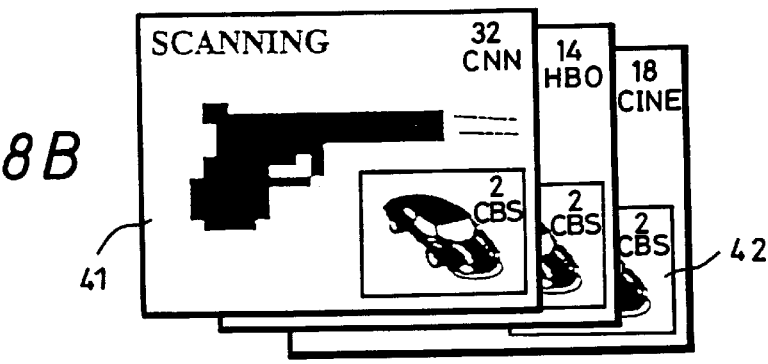

FIG. 8A shows a manner in which the viewer watches a broadcasting program broadcasted with a channel number "2" and a name of the broadcasting station is "CBS" on a main picture 41 and a broadcasting program broadcasted with a channel number "82" and a name of broadcasting station "PBS" on a sub-picture 42 in the PinP mode. Under this state, if the viewer presses the program-scan key 27 of the remote commander 14, as shown in FIG. 8B, the image of the program that has been watched so far by the viewer is saved in the sub-picture 42. At that time, the channel number and the name of the broadcasting station of the broadcasting program thus saved are displayed in the upper right of the sub-picture 42 as shown in FIG. 8B.

Then, characters "SCANNING" indicating the program-scanning mode and images of broadcasting programs tuned in by the program-scanning in the order of set channels are sequentially displayed on the main picture 41 at every one period of the channel changing period. Also, channel numbers and names of broadcasting stations of the displayed broadcasting programs are displayed on the upper right of the main picture 41 as shown in FIG. 8B.

At that time, since the channels are program-scanned in the order of set channels, the channel numbers and the names of the broadcasting stations of the displayed broadcasting programs are changed and displayed on the main picture 41 as shown in FIG. 8B, for example.

Figure 8C:
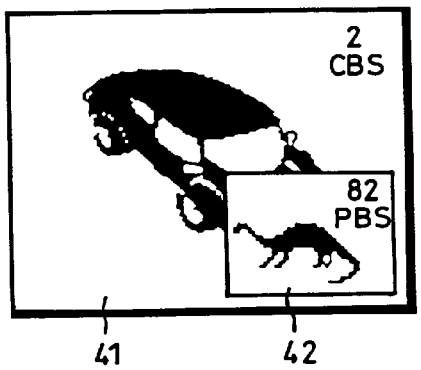

During this program-scanning mode, if the viewer presses again the program-scan key 27 of the remote commander 14, then the program-scanning mode is ended, and as shown in FIG. 8C, the displayed picture is returned to the original picture of the program of the channel tuned in the PinP mode shown in FIG. 8A.

Figure 8D:
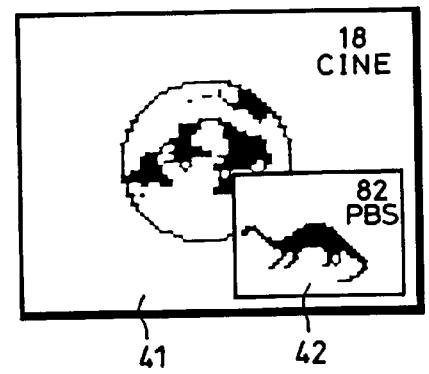

Further, during the program-scanning mode, if the viewer presses the enter key 28 of the remote commander 14, then as shown in FIG. 8D, the tuning state is controlled in such a manner that the image of the broadcasting program that has been watched so far by the viewer before the program-scanning is started is displayed on the sub-picture 42 and that the main picture 41 is fixed to the state presented when the enter key 28 is pressed. Then, the program-scanning mode is ended.

In the television receiver according to the first embodiment, the program-scanning is started and stopped by the viewer's instruction. Hereinafter, a television receiver in which the program-scanning is effected automatically according to a second embodiment of the present invention will be described with reference to FIG. 9 and the following sheets of drawings.

In the recent television broadcasting, an identification code called an ISCI (Industry Standard Coding Identification) code is superimposed upon a commercial television signal so that a sponsor of the television broadcasting program such as enterprise can check whether or not its commercial is broadcasted correctly a correct number of times during a time zone bought by the sponsor for broadcasting its own television commercial. Accordingly, when the television signal contains the ISCI code, this means that the commercial is broadcasted.

According to the second embodiment of the present invention, in view of the aforesaid aspects, when the ISCI code is detected from the commercial television signal, the program-scanning can be started automatically. When the ISCI code is not detected from the commercial television signal and the broadcasting of the television commercial is ended, the program-scanning is stopped automatically. However, in the second embodiment, the viewer can determine on the set picture whether or not the automatic program-scanning should be carried out.

Figure 9A:
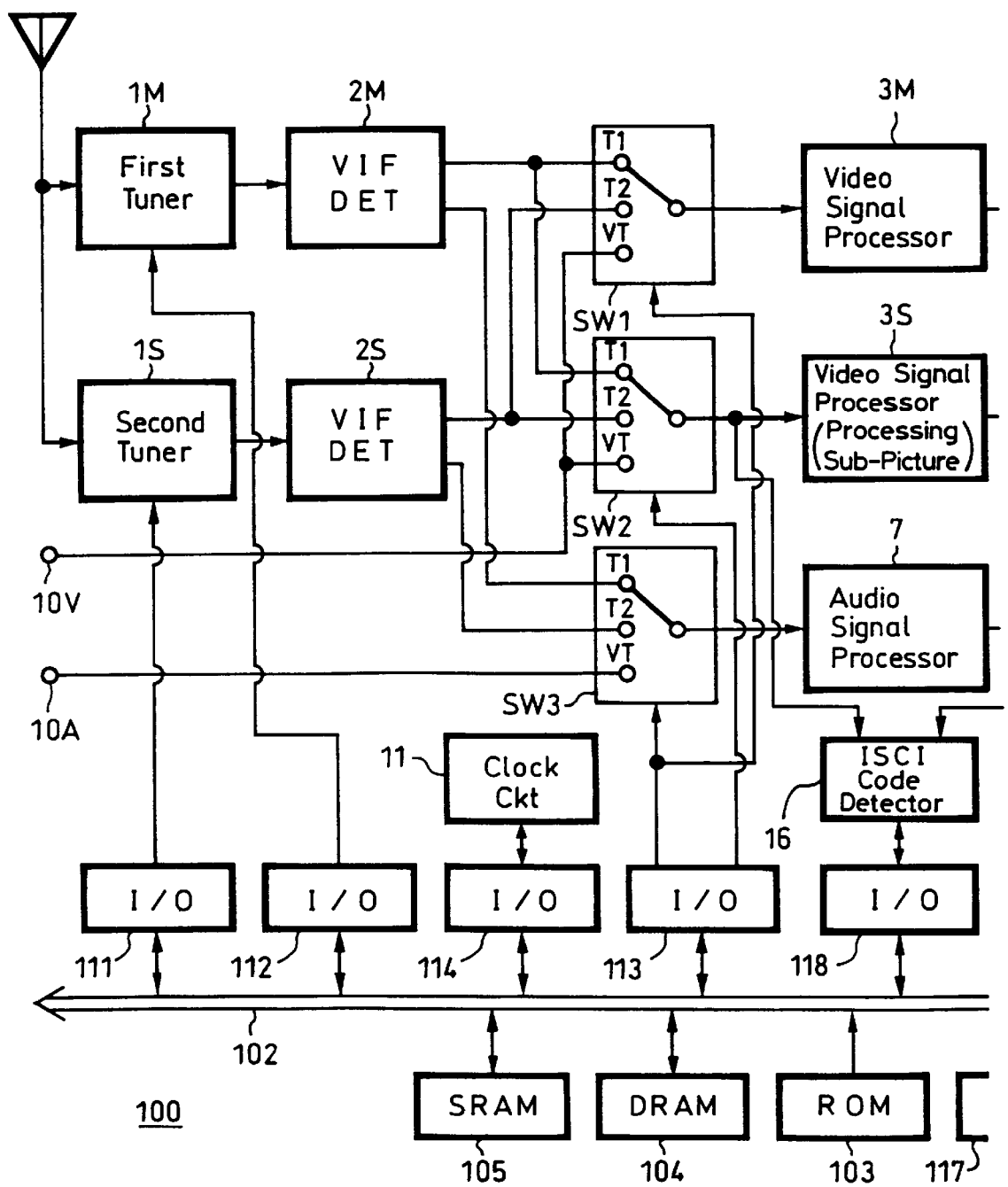
FIG. 9 (formed of FIGS. 9A and 9B drawn on two sheets of drawings to permit the use of a suitably large scale) is a block diagram showing a television receiver according to a second embodiment of the present invention.
Figure 9B:
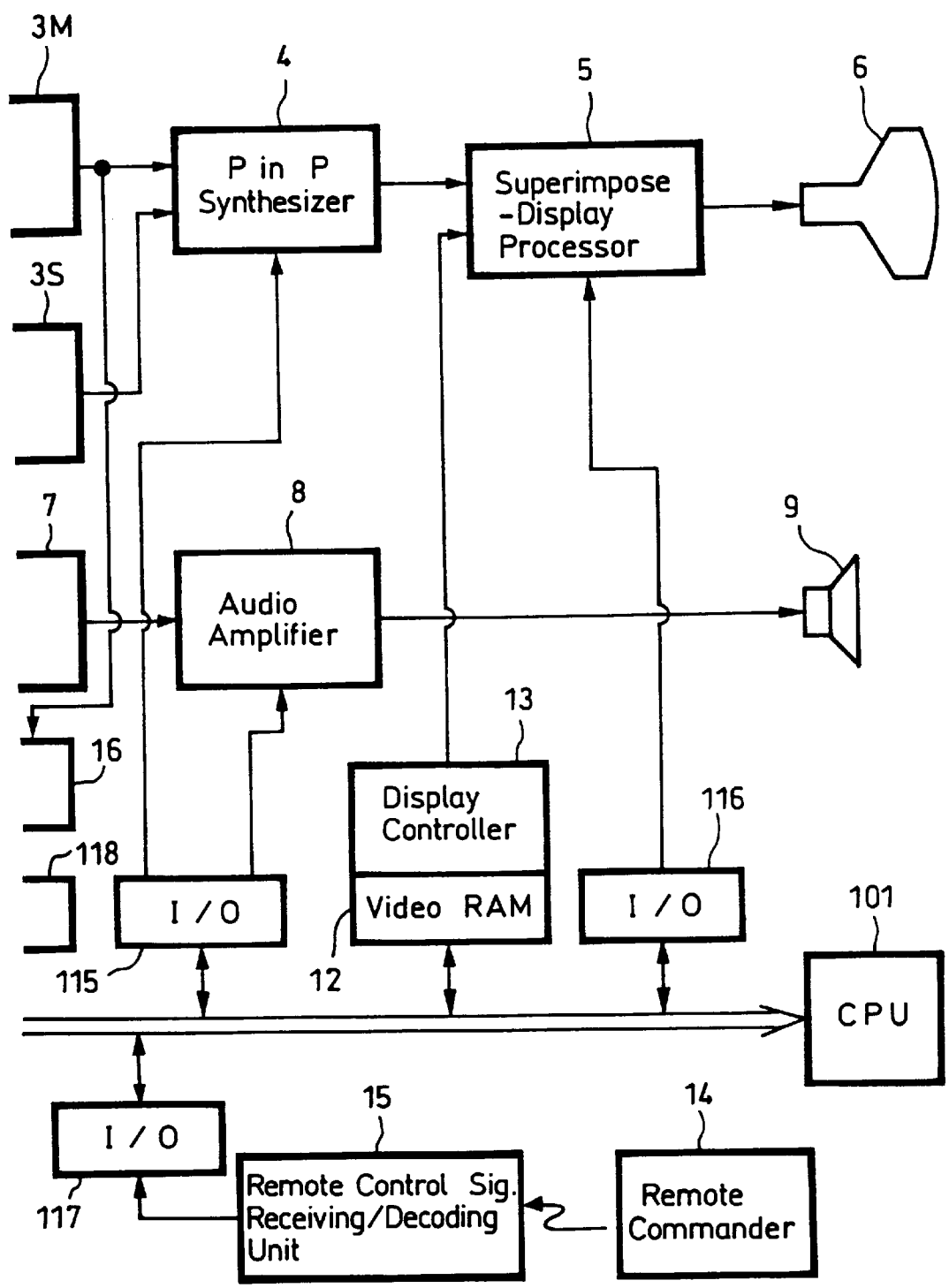

FIG. 9 (formed of FIGS. 9A and 9B drawn on two sheets of drawings to permit the use of a suitably large scale) is a block diagram showing a television receiver according to the second embodiment of the present invention. As shown in FIG. 9, a signal indicative of a single picture or a main picture from a video signal processor 3M and a signal from a switch circuit SW2 are supplied to an ISCI code detector 16. A detected signal from the ISCI code detector 16 is supplied through an I/O port 118 to a control circuit 100, in which it is used to detect a timing at which the automatic program-scanning is started. Set information for determining whether the automatic program-scanning should be made by the viewer's setting is stored in a SRAM 105. The rest of the arrangement is exactly the same as that of FIG. 1, and therefore need not be described in detail.

Figure 10:
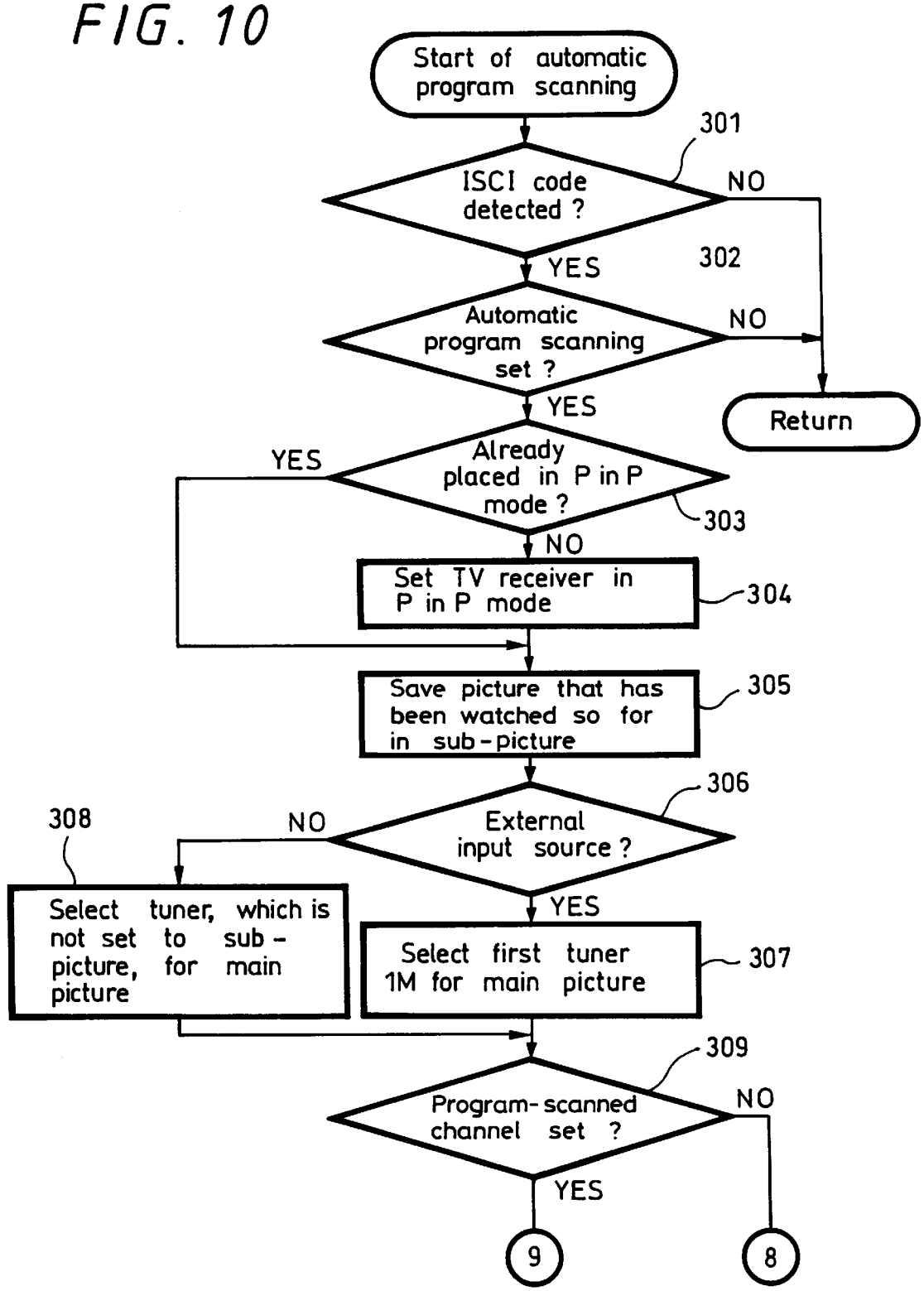
FIG. 10 is a flowchart to which reference will be made in explaining a manner in which the television receiver according to the second embodiment is automatically placed in the program-scanning mode.

FIG. 10 is a flowchart of a processing routine executed by the control circuit 100 when the automatic program-scanning is effected.

As shown in FIG. 10, the control circuit 100 starts this processing routine by an interrupt of a predetermined period, for example. Then, Control goes to the next decision step 301, whereat it is determined based on the output from the video signal processor 3M whether or not the ISCI code is detected by the ISCI detector 16. If the ISCI code is not detected as represented by a NO at the decision step 301, then this routine is ended and control goes back to the main processing. If on the other hand the ISCI code is detected as represented by a YES at the decision step 301, then control goes to the next decision step 302, whereat it is determined whether or not the automatic program-scanning is set. If the automatic program-scanning is not set as represented by a NO at the decision step 302 even under the condition that the ISCI code is detected at the decision step 301, then this routine is ended and control goes back to the main processing.

If the ISCI code is detected based on the output from the video signal processor 3M at the decision step 301 and it is also determined that the automatic program-scanning is set at the decision step 302, then the automatic program-scanning is started and the next decision step 303 and the following steps are executed.

In the decision step 303, it is determined whether or not the television receiver is already placed in the PinP mode. If the television receiver has already been placed in the PinP mode as represented by a YES at decision step 303, then control goes to a step 305. If on the other hand the television receiver is not already placed in the PinP mode as represented by a NO at the decision step 303, then control goes to a step 304, whereat the television receiver is placed in the PinP mode, and control goes to a step 305.

In the step 305, the switch circuit SW2 is switched in such a manner that the broadcasting program or the external input source that has been watched so far by the viewer as a single picture or a main picture is saved in the sub-picture. Then, control goes to the next decision step 306, whereat it is determined whether or not the single picture of the main picture that has been watched so far by the viewer is an external input source such as a VTR. If the main picture that has been watched so far by the viewer is the external input source as represented by a YES at the decision step 306, then control goes to a step 307, whereat the switch circuit SW1 is switched so as to select the first tuner 1M for the main picture. If it is not the external input source as represented by a NO at the decision step 306, then control goes to step 308, wherein the switch circuit SW1 is switched so as to select a tuner, which is not set to the sub-picture, from the first and second tuners 1M and 1S for the main picture.

After the step 307 or 308, control goes to the next decision step 309, whereat it is determined whether or not the program-scanned channel is set. This judgement can be executed based on a flag indicative of the setting because this setting flag is registered in the DRAM 104 when the program-scanned channel is set.

Figure 11:
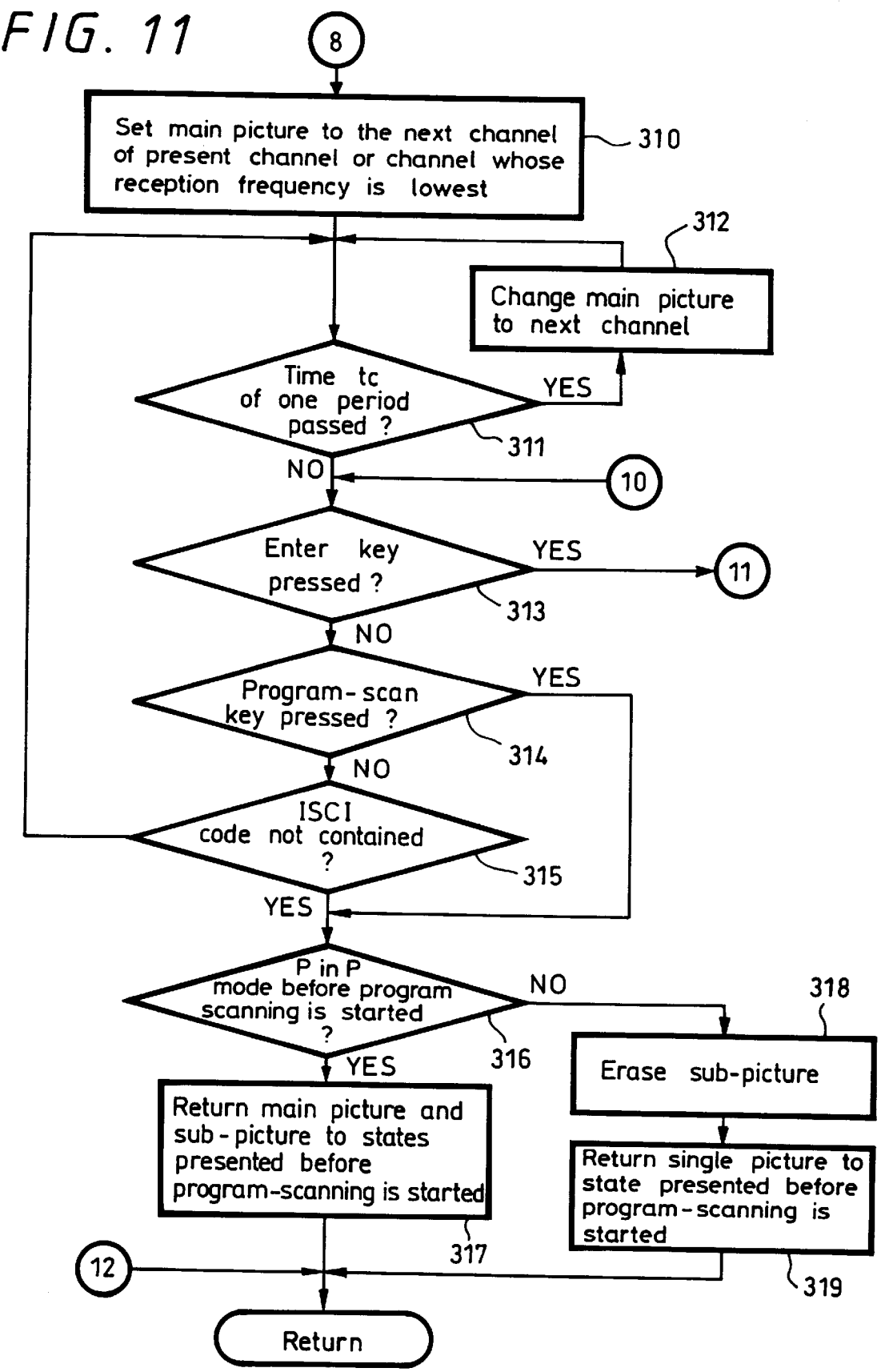
FIG. 11 is a flowchart to which reference will be made in explaining a manner in which the television receiver according to the second embodiment is automatically placed in the program-scanning mode.

If the program-scanned channel is not set as represented by a NO at the decision step 309, then control goes to a flowchart shown in FIG. 11, wherein the tuning state of the tuner for the main picture is controlled so as to select the start channel of the program-scanning (step 310).

If the image that has been watched so far by the viewer as the single picture or the main picture is the external input source, then the start channel of the program-scanning is set to a channel with the lowest reception frequency. Further, if the image that has been watched so far by the viewer as the single picture or the main picture is the program of the broadcasting station tuned in by the first tuner 1M or the second tuner 1S, the start channel of the program-scanning is set to the next broadcasting channel whose reception frequency is higher than that of the above broadcasting channel. As mentioned before, during the program-scanning, information indicative of the program-scanning, e.g., characters "SCANNING", for example, are displayed on the main picture.

Thereafter, control goes to the next decision step 311, whereat it is determined whether or not the time tc of one channel changing period stored in the SRAM 105 as channel changing period has passed.

If it is determined in the decision step 311 that the time tc of one period of channel changing is passed, then control goes to a step 312, whereat the tuning is controlled so as to select the next channel to be program-scanned.

When there is a broadcasting channel with a reception frequency higher than that of the broadcasting channel that has been displayed as the main picture, the next channel to be program-scanned is determined by controlling the tuning state of the tuner for the main picture in such a manner that such channel is selected. When there is no channel with a reception frequency higher than the other channels, the next program-scanned channel is returned to the channel with the lowest reception frequency.

After the tuning state of the next program-scanned channel is presented and the next program-scanned channel is displayed on the main picture, then control goes back to the step 311, whereat it is determined whether or not the time tc of one period of the channel changing has passed.

If on the other hand the time tc of one period of the channel changing period is not yet passed as represented by a NO at the decision step 311, then control goes to the next step 313, whereat it is determined whether or not the enter key 28 is pressed. If the enter key 28 is not pressed as represented by a NO at the decision step 313, then control goes to the next step 314, whereat it is determined whether or not the program-scan key 27 is pressed.

If it is determined in decision step 314 that the program-scan key 27 is pressed, then control goes to a decision step 316, whereat the program-scanning is stopped as will be described later on. If on the other hand the program-scan key 27 is not pressed as represented by a NO at decision step 314, then control goes to the next decision step 315, whereat it is determined by the detected signal from the ISCI code detector 16 whether or not the ISCI code is not contained in the output signal from the switch circuit SW2.

If the ISCI code still exists in the output signal from the switch circuit SW2 and the channel that has been displayed so far till the program-scanning is started lies in the commercial broadcasting period as represented by a NO at the decision step 315, then control goes back to the decision step 311, whereat it is determined whether or not the time tc of one period of the channel changing has passed. If on the other hand the ISCI code does not exist in the output signal from the switch circuit SW2, then the program-scanning at steps 316 to 319 is stopped.

Specifically, it is determined at the decision step 316 whether or not the television receiver is placed in the PinP mode before the program-scanning is started. If the television receiver is placed in the PinP mode as represented by a YES at decision step 316, then control goes to a step 317, whereat the tuning states of the first and second tuners 1M, 1S and the switched states of the switch circuits SW1 to SW3 are controlled in such a manner that the main picture and the sub-picture are returned to the states presented before the program-scanning is started, and the program-scanning mode is ended. Thereafter, control goes back to the step 201, whereat the television receiver is placed in the state for awaiting the input of the command signal.

If on the other hand the television receiver is not placed in the PinP mode before the program-scanning is started, control goes to a step 318, whereat the sub-picture is erased, and control goes to a step 319. In the step 319, the single picture is returned to the state presented before the program-scanning is started. Then, control goes back to the step 201, whereat the television receiver is placed in the mode for awaiting the input of the command signal.

Figure 12:
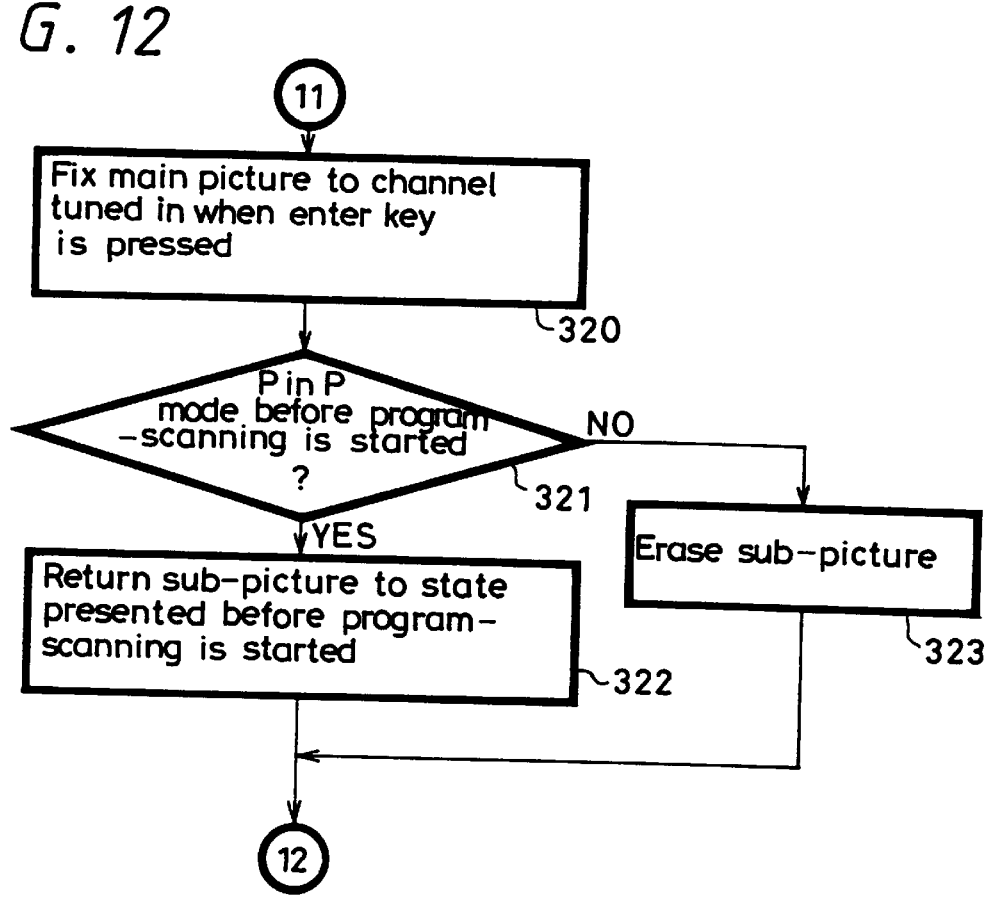
FIG. 12 is a flowchart to which reference will be made in explaining a manner in which the television receiver according to the second embodiment is automatically placed in the program-scanning mode.

If the enter key 28 is depressed as represented by a YES at decision step 313, then the program-scanning is ended. Thereafter, control goes to a step 320 of FIG. 12, whereat a main picture is fixed to the channel tuned in when the enter key 28 is pressed.

Then, control goes to the next decision step 321, whereat it is determined whether or not the television receiver is placed in the PinP mode before the program-scanning is started. If the television receiver is placed in the PinP mode as represented by a YES at the decision step 321, then control goes to a step 322, whereat the tuned states of the first and second tuners 1M, 1S and the switched state of the switch circuit SW2 are controlled in such a manner that the state of the sub-picture is returned to the state presented before the program-scanning is started. Thereafter, control goes back to the step 201, whereat the television receiver is placed in the state for awaiting the input of the command signal. If on the other hand the television receiver is not placed in the PinP mode before the program-scanning is started as represented by a NO at the decision step 321, then control goes to a step 323, wherein the sub-picture is erased. Then, control goes back to the step 201, whereat the television receiver is placed in the state for awaiting the input of the command signal.

Figure 13:
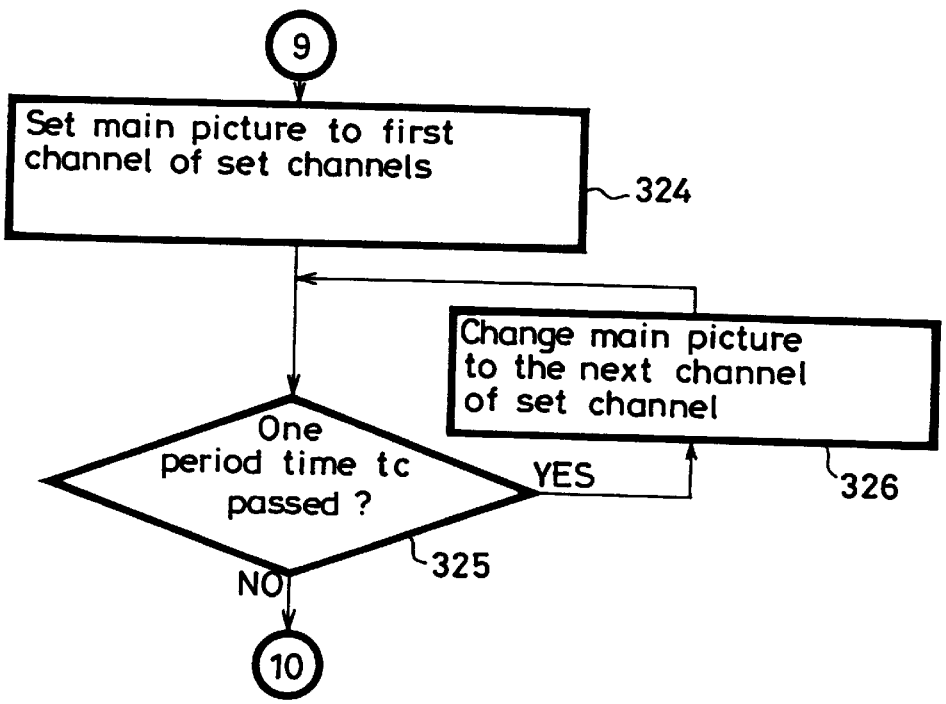
FIG. 13 is a flowchart to which reference will be made in explaining a manner in which the television receiver according to the second embodiment is automatically placed in the program-scanning mode.

Referring back to FIG. 10, if it is determined at the decision step 309 that the program-scanning channel is set, then control goes to a step 324 in FIG. 13, whereat the tuning state of the tuner for the main picture is controlled in such a manner that the first channel that should be set as tuned channel from one to a plurality of channels to be program-scanned is displayed as a main picture.

Then, control goes to the next decision step 325, whereat it is determined, similarly to the step 311, whether or not the time tc of one period of the channel changing is passed. If the time tc of one period of the channel changing is passed as represented by a YES at decision step 325, then control goes to a step 326, whereat the tuning state of the tuner for the main picture is controlled in such a manner that the broadcasting station to be tuned in next is selected from one to a plurality of channels set as program-scanned channels. Thereafter, control goes back to the decision step 325, wherein it is determined whether or not the time tc of one period of channel changing is passed.

If on the other hand the time tc of one period of channel changing is not passed as represented by a NO at the decision step 325, then control goes to the step 313 shown in FIG. 11, wherein the steps 313 to 323 are repeated.

Typical examples of the program-scanning according to the second embodiment of the present invention will be described with reference to a manner in which the display of pictures is changed.

FIGS. 14A through 14G are pictorial representations illustrative of a manner in which pictures are changed when a single picture is displayed on the picture screen of the television receiver after a broadcasting of TV commercial is started and the program-scanning is automatically carried out. In the case of this embodiment, program-scanned channels are set previously and only a plurality of channels thus set are scanned sequentially.

Figure 14A:
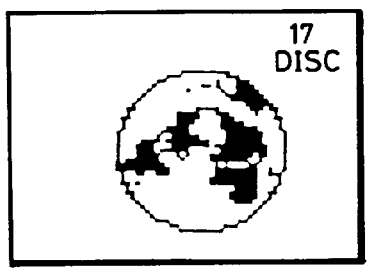
FIGS. 14A through 14G are pictorial representations showing a manner in which pictures displayed on the picture screen of the television receiver according to the second embodiment are changed in accordance with a proceeding of a program-scanning.
Figure 14B:
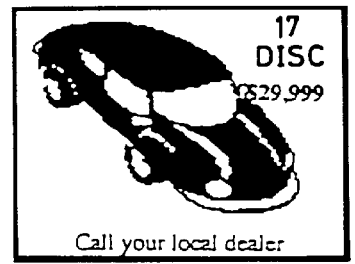
Figure 14C:
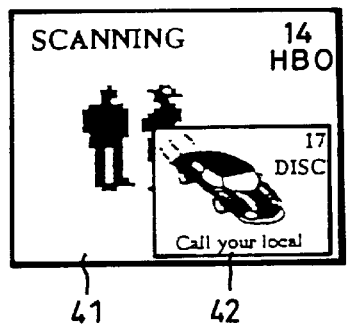
Figure 14D:
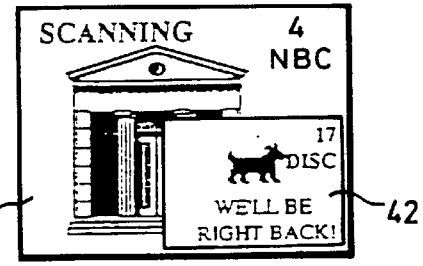

Specifically, FIG. 14A shows a manner in which the viewer watches a single picture of a broadcasting program with a channel number "17" and a broadcasting station name "DISC". Under this state, if a commercial is broadcasted in the broadcasting program of the corresponding channel as shown in FIG. 14B and the ISCI code is contained in the television signal, then the mode is automatically changed to the program-scanning mode. As shown in FIGS. 14C and 14D, images of the programs that have been watched so far by the viewer are saved in the sub-pictures. At that time, the channel numbers and broadcasting station names of the saved broadcasting programs are displayed on the upper right of the sub-pictures 42.

As shown in FIGS. 14C and 14D, characters "SCANNING" indicative of the program-scanning mode and images of the broadcasting program tuned in by the program-scanning in the order of set channels are sequentially displayed on a main picture 41 for every one period time of the channel changing cycle. Also, the channel numbers and the broadcasting station names of the displayed broadcasting programs are displayed on the upper right of the main picture 41 as shown in FIGS. 14C and 14D.

Figure 14E:
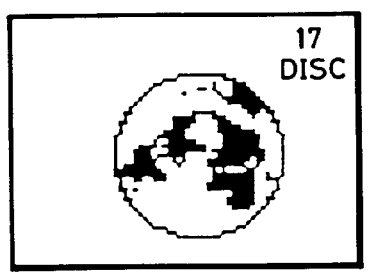

If the broadcasting of TV commercial is ended in the channel displayed on the sub-picture 42 and the ISCI code is not detected any more, then the program-scanning mode is automatically ended and, as shown in FIG. 14E, the displayed picture is returned to the program picture of the original tuned channel shown in FIG. 14A.

Figure 14F:
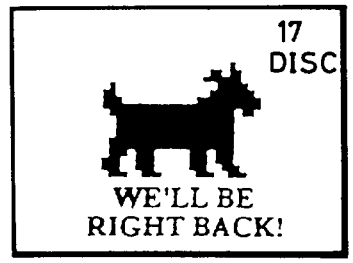
Figure 14G:
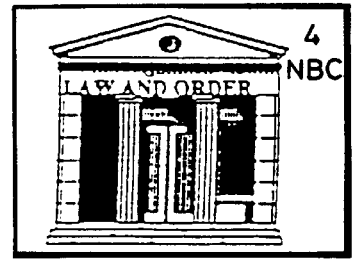

In the state shown in FIG. 14D, if the viewer presses the program-scan key 27 of the remote commander 14, as shown in FIG. 14F, the sub-picture is erased, and the tuning is controlled such that a single picture is placed in the tuning state of the main picture presented when the enter key 28 is pressed, as shown in FIG. 14G. Then, the program-scanning mode is ended.

While the present invention is applied to the television receiver for receiving ground broadcasting waves, the principle of the present invention may be applied to a digital satellite broadcasting which become available in the U.S.A. In Japan, the frequency band is splitted at every 6 MHz, each divided frequency band is used as a broadcasting transmission channel, whereby one broadcasting station is assigned to one broadcasting transmission channel, i.e., the channels corresponding to broadcasting programs are made corresponding to in a one-to-one relation. Therefore, if one broadcast transmission channel is selected, then it is possible to select and receive the program of a particular broadcast station (to which the broadcast program corresponding channel corresponds).

According to the digital satellite broadcasting, the transmission channel and the program corresponding channel (in this embodiment, corresponding to broadcasting station) are not agreed with each other, and the channel does not indicate a particular frequency band because the broadcast frequency band should be utilized effectively.

Specifically, in the digital satellite broadcast, a video signal and an audio signal are broadcasted by data compression based on the MPEG1 (Moving Picture Experts Group 1) and the MPEG2 (Moving Picture Experts group 2). If a picture of a program are less in motion, then information amount to be broadcasted may be small. If on the other hand a picture of a program are large in motion, there is required a large amount of information in order to broadcast such picture without degrading a picture quality. Therefore, when a certain program is broadcasted, the broadcast frequency band is effectively utilized by changing the broadcast frequency or frequency groups used in response to a broadcast information amount. Specifically, when the information amount is small, a plurality of programs can be broadcasted by one frequency or one frequency groups. If on the other hand the information amount is large, then it is frequently observed that even one program has to be broadcasted by use of a plurality of frequencies or a plurality of frequency groups.

In the digital satellite broadcasting, since a manner in which the broadcasting wave is used is not fixed to the broadcasting program corresponding channel, information indicative of the manner in which other broadcasting wave frequency or frequency group is used for the broadcasting program corresponding channel as a broadcasting signal of a particular frequency group. This information is referred to as "index channel" in this specification. Information of this index channel contains information indicative of a broadcasting program schedule. Therefore, in the digital satellite broadcasting, a broadcasting program corresponding channel to be program-scanned can be previously set based on the broadcasting program schedule.

In the case of digital television broadcasting, two tuners need not be provided and can be replaced with one program selector and two decoders. Then, since the transmission channel of the broadcasting wave and the broadcasting program corresponding channel indicative of the program are not agreed with each other, in this case, the broadcasting program corresponding channel is set as a channel to be program-scanned, and this broadcasting program corresponding channel is stored as set channel information.

While the television receiver according to the present invention incorporates therein two television tuners, the principle of the present invention is not limited thereto and may be applied to a television receiver including one turner and an external input terminal and in which a program-scan key is pressed when the viewer watches an image supplied from an external input source through the external input terminal.

The present invention may also be applied to television receivers incorporating not the external input source but a disk reproducing apparatus and a disk recording and reproducing apparatus such as a VTR or a laser disk player.

In this specification, the sub-picture means a picture whose size is equal to the main picture or a picture smaller than the main picture. The present invention can also be applied to a so-called two-picture screen television receiver in which a picture screen is equally divided into two picture screens.

As described above, according to the present invention, the program-scanning can be executed on the main picture screen while the broadcasting program that has been mainly watched so far until the program-scanning is started is displayed on the sub-picture screen. Accordingly, the broadcasting program that has been viewed until the program-scanning is started can be prevented from being erased on the picture screen. Further, since the program-scanning is carried out on the main picture screen, the contents of program can be recognized reliably.

Furthermore, since only the previously-set program corresponding channel can be program-scanned, it is possible to realize an efficient program-scanning which meets with a viewer's request.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A television receiver in which independent images are respectively displayed on a sub-picture screen of a part of an image display area and a main picture screen of an image display area other than said sub-picture screen, comprising:

first and second tuners for independently carrying out tuning operations and respectively providing output signals;

signal processing means supplied with one of said output signals from one of said first and second tuners for processing said one output signal to display said one output signal on said sub-picture screen;

synthesizing means for synthesizing the other of said output signals from said first and second tuners and an output signal from said signal processing means;

switching means for selectively supplying the output signals of said first and second tuners to said signal processing means and said synthesizing means; and control means for controlling said switching means such that a video signal received at one of said first and second tuners and displayed on said main picture screen is displayed on said sub-picture screen, and displaying a video signal of said main picture screen by sequentially changing a tuning channel of the other of said first and second tuners.

2. The television receiver according to claim 1, further comprising operation means operated by a viewer and wherein when an operation is carried out by said operation means, said control means starts controlling said switching means and starts changing said tuning channel.

3. The television receiver according to claim 1, further comprising detecting means for detecting a period during which a TV commercial is broadcast and received and wherein when said detecting means detects that a broadcasting of said TV commercial is started, said control means starts controlling said switching means and starts changing the tuning channel.

4. The television receiver as claimed in claim 1, wherein said switching means selectively switches the video signals from one of said first and second tuners and an external video signal input from outside.

5. The television receiver according to claim 1, further comprising setting means for setting a channel to be tuned and wherein said control means sequentially changes the tuning channel in accordance with said setting means.

6. The television receiver according to claim 1, further comprising clock means for counting a time when said control means starts controlling said switching means and starts changing the tuning channel and wherein when said clock means detects that a predetermined time has passed, said control means stops changing the tuning channel and returns said switching means to an original state.

7. The television receiver according to claim 6, further comprising operation means operated by a viewer and wherein when an operation is effected by said operation means before said clock means detects that said predetermined time has passed, said control means stops changing the tuning channel.

8. The television receiver according to claim 6, further comprising operation means operated by a viewer and wherein when an operation is effected by said operation means before said clock means detects that said predetermined time has passed, said control means stops changing the tuning channel and returns said switching means to the original state.

9. The television receiver according to claim 1, further comprising superimposing display means for overlaying channel information upon pictures displayed in said sub-picture screen and said main picture screen.

10. The television receiver according to claim 1, further comprising setting means for setting a period during which the tuning channel is sequentially changed.

11. A method of controlling a channel-selection of a television receiver in which an image display area is divided into a main picture screen and a sub-picture screen on which independent images are displayed and a viewer is allowed to select a desired channel, comprising:

a first step for displaying a video signal, which has been received at a first tuner and displayed on said main picture screen, as a sub-picture;

a second step for displaying a video signal received at a second tuner as a main picture; and a third step for sequentially changing a tuned channel by said second tuner at every predetermined time period.

12. The method of controlling a channel-selection of a television receiver according to claim 11, further comprising a fourth step of setting a predetermined time during which said channel is changed sequentially.

13. The method of controlling a channel-selection of a television receiver according to claim 12, further comprising a fifth step for accepting a first operation done by a viewer and wherein said first, second and third steps are executed when said first operation is accepted.

14. The method of controlling a channel-selection of a television receiver according to claim 13, further comprising a sixth step for detecting a period during which a commercial is broadcasted and wherein said first, second and third steps are executed when a broadcasting of said commercial is started.

15. The method of controlling a channel-selection of a television receiver according to claim 14, further comprising a seventh step for setting a tuned channel and wherein the tuned channel selected by said second tuner in said third step is changed in accordance with a set channel.

16. The method of controlling a channel-selection of a television receiver according to claim 15, further comprising an eighth step for starting counting a time when said third step starts changing a channel and a ninth step for displaying a picture displayed on said sub-picture screen on said main picture screen.

17. The method of controlling a channel-selection of a television receiver according to claim 16, further comprising a tenth step for accepting a second operation done by a viewer and an eleventh step for stopping a change of channel in said third step and displaying a picture displayed on said sub-picture screen on said main picture screen when said second operation is accepted before an elapse of said predetermined time is detected.

18. The method of controlling a channel-selection of a television receiver according to claim 17, further comprising a twelfth step for overlaying channel information upon pictures displayed on said sub-picture screen and said main picture screen.

19. A method of operating a television receiver in which an image display area is divided into a main picture screen and a sub-picture screen on which independent images are respectively displayed and in which a viewer selects a desired channel, including:

a first step of displaying a video signal, which has been received at a first tuner and displayed on the main picture screen, on the sub-picture-screen;

a second step of displaying a video signal, which is received by a second tuner, on said main picture screen; and a third step of sequentially changing a channel selected by said second tuner at every predetermined time.

* * * * *